US012616924B2

(12) United States Patent
Schmitt et al.

(10) Patent No.: US 12,616,924 B2
(45) Date of Patent: May 5, 2026

(54) LEAK DETECTION AND RESPONSE SYSTEM FOR A PRESSURE VESSEL

(71) Applicant: Watts Regulator Co., North Andover, MA (US)

(72) Inventors: Craig Schmitt, Peoria, AZ (US); Monica Preston, Glendale, AZ (US)

(73) Assignee: Watts Regulator Co., North Andover, MA (US)

( * ) Notice: Subject to any disclaimer, the term of this patent is extended or adjusted under 35 U.S.C. 154(b) by 502 days.

(21) Appl. No.: 18/343,143

(22) Filed: Jun. 28, 2023

(65) Prior Publication Data

US 2023/0398477 A1 Dec. 14, 2023

Related U.S. Application Data

(63) Continuation of application No. 17/587,674, filed on Jan. 28, 2022, now Pat. No. 11,745,127, which is a
(Continued)

(51) Int. Cl.
*B01D 35/147* (2006.01)
*B01D 35/143* (2006.01)
(Continued)

(52) U.S. Cl.
CPC ......... *B01D 35/147* (2013.01); *B01D 35/143* (2013.01); *F16K 31/055* (2013.01);
(Continued)

(58) Field of Classification Search
CPC ....... F16K 11/22; F16K 37/00; B01D 35/147; B01D 2201/165; B01D 2201/4061; G01M 3/007; G01M 3/184; G01M 3/16
See application file for complete search history.

(56) References Cited

U.S. PATENT DOCUMENTS

| | | | |
|---|---|---|---|
| 163,814 A | 5/1875 | Sinclaire | |
| 171,056 A | 12/1875 | Sinclaire | |

(Continued)

FOREIGN PATENT DOCUMENTS

| | | | |
|---|---|---|---|
| EP | 0556506 A1 | 8/1993 | |
| EP | 3284526 A1 | 2/2018 | |

(Continued)

OTHER PUBLICATIONS

Chandler Systems; Drop Water Management System and Mobile App User Guide; Jan. 2020; 40 pages.
(Continued)

*Primary Examiner* — Atif H Chaudry
(74) *Attorney, Agent, or Firm* — Day Pitney LLP; George Chaclas; Anthony A. Kassas

(57) ABSTRACT

A leak detection and response system includes a valve assembly with a housing defining an internal passageway. The valve assembly includes an internal inlet port, an internal outlet port, a valve port assembly, an external inlet port, and an external outlet port each in fluid communication with the internal passageway. The valve assembly includes a first sensor port disposed either between the external outlet port and the internal inlet port, or between the external inlet port and the internal outlet port. The valve assembly includes a first leak sensor positioned in the first sensor port for generating a signal indicating a presence of water. The valve assembly includes a controller configured to receive the signal from the first leak sensor, and control the valve assembly to align the valve port assembly to block water flow from the external inlet port.

16 Claims, 21 Drawing Sheets

Related U.S. Application Data continuation of application No. 16/544,026, filed on Aug. 19, 2019, now Pat. No. 11,333,264.

(60) Provisional application No. 62/804,051, filed on Feb. 11, 2019.

(51) Int. Cl.

| | | |
|---|---|---|
| *F16K 31/05* | (2006.01) | |
| *F16K 37/00* | (2006.01) | |
| *G01M 3/00* | (2006.01) | |
| *G01M 3/16* | (2006.01) | |
| *G01M 3/18* | (2006.01) | |
| *C02F 1/00* | (2023.01) | |

(52) U.S. Cl.

CPC ......... *F16K 37/0008* (2013.01); *G01M 3/007* (2013.01); *G01M 3/16* (2013.01); *G01M 3/184* (2013.01); *B01D 2201/165* (2013.01); *B01D 2201/52* (2013.01); *C02F 1/001* (2013.01); *C02F 2201/005* (2013.01); *C02F 2209/008* (2013.01); *F16K 37/00* (2013.01)

(56) References Cited

U.S. PATENT DOCUMENTS

| | | | |
|---|---|---|---|
| 2,027,400 | A | 1/1936 | Pennebaker |
| 2,313,307 | A | 3/1943 | Wilkinson |
| 3,174,623 | A | 3/1965 | Sloan |
| 3,246,920 | A | 4/1966 | Pall |
| 3,669,148 | A | 6/1972 | Burkhalter et al. |
| 3,746,171 | A | 7/1973 | Thomsen |
| 3,854,902 | A | 12/1974 | Kalen |
| 3,870,636 | A | 3/1975 | Schettler |
| 3,969,446 | A | 7/1976 | Franklin |
| 3,984,325 | A | 10/1976 | Rosaen |
| 4,559,138 | A | 12/1985 | Harms, II |
| 4,693,823 | A | 9/1987 | Matchett |
| 4,919,849 | A | 4/1990 | Litz et al. |
| 4,989,636 | A | 2/1991 | Hunter et al. |
| 5,041,219 | A | 8/1991 | Strand et al. |
| 5,045,187 | A | 9/1991 | Suchanek |
| 5,076,918 | A | 12/1991 | Foust et al. |
| 5,141,637 | A | 8/1992 | Reed et al. |
| 5,171,442 | A | 12/1992 | Nakshbendi |
| 5,190,069 | A * | 3/1993 | Richards ................. G01M 3/18 73/49.1 |
| 5,328,609 | A | 7/1994 | Magnusson et al. |
| 5,545,319 | A | 8/1996 | Hart et al. |
| 5,655,561 | A | 8/1997 | Wendel et al. |
| 6,042,729 | A | 3/2000 | Chau |
| 6,090,285 | A | 7/2000 | Chau |
| 6,231,763 | B1 | 5/2001 | Chau |
| 6,283,153 | B1 | 9/2001 | Brisco et al. |
| 6,402,944 | B1 | 6/2002 | Vaughan |
| 6,447,678 | B2 | 9/2002 | Chau |
| 7,186,338 | B2 | 3/2007 | Boisvert |
| 8,295,452 | B1 | 10/2012 | Trandal et al. |
| 8,349,183 | B2 | 1/2013 | Field |
| 9,527,015 | B2 | 12/2016 | Chau |
| 9,815,725 | B2 | 11/2017 | Rice |
| 10,207,206 | B2 | 2/2019 | Chau |
| 2001/0008218 | A1 | 7/2001 | Chau |
| 2001/0035510 | A1 | 11/2001 | Oh |
| 2005/0162280 | A1 * | 7/2005 | Hayashida .............. G01M 3/16 340/619 |
| 2007/0181191 | A1 * | 8/2007 | Wittig .................... F16K 11/20 137/551 |
| 2010/0170857 | A1 | 7/2010 | Williams et al. |
| 2011/0108489 | A1 | 5/2011 | Fritze et al. |
| 2012/0000858 | A1 | 1/2012 | Butler et al. |
| 2013/0056402 | A1 | 3/2013 | Chau |
| 2013/0306170 | A1 | 11/2013 | Rivera |
| 2014/0048469 | A1 | 2/2014 | Wilder et al. |
| 2014/0263054 | A1 | 9/2014 | Julos et al. |
| 2015/0101295 | A1 | 4/2015 | Thompson et al. |
| 2016/0016817 | A1 | 1/2016 | Chau |
| 2016/0096750 | A1 | 4/2016 | Chau |
| 2018/0259982 | A1 | 9/2018 | Halimi |
| 2019/0070535 | A1 | 3/2019 | Patterson et al. |
| 2019/0383511 | A1 | 12/2019 | Tomita et al. |
| 2020/0353382 | A1 | 11/2020 | Chau |
| 2021/0023492 | A1 | 1/2021 | Chirme et al. |
| 2021/0260511 | A1 | 8/2021 | Bonilla |

FOREIGN PATENT DOCUMENTS

| | | |
|---|---|---|
| EP | 3647274 A1 | 5/2020 |
| JP | H09174050 A | 8/1997 |
| WO | 2001026772 A2 | 4/2001 |
| WO | 2006031838 A1 | 3/2006 |
| WO | 2013063566 A1 | 5/2013 |
| WO | 2014004607 A1 | 1/2014 |
| WO | 2014053956 A1 | 4/2014 |
| WO | 2018223276 A1 | 12/2018 |
| WO | 2019148415 A1 | 8/2019 |

OTHER PUBLICATIONS

Communication pursuant to Article 94(3) EPC, issued in corresponding European patent application No. 20275036.0, mailed Jul. 8, 2021, 5 pages.

European Search Report for European Patent Application No. 20275035.2 dated Jun. 2, 2020, 13 pages.

European Search Report for European Patent Application No. 20275036.0, dated Jun. 4, 2020, 12 pages.

European Search Report for European Patent Application No. 20275037.8 dated Jun. 8, 2020, 8 pages.

Examination Report issued in corresponding European patent application No. 20275035.2, mailed Aug. 7, 2021, 7 pages.

* cited by examiner

LEAK DETECTION AND RESPONSE SYSTEM FOR A PRESSURE VESSEL

CROSS-REFERENCE TO RELATED APPLICATIONS

This application is a continuation of and claims the benefit of Non-Provisional U.S. application Ser. No. 17/587,674, filed on Jan. 28, 2022, which is a continuation of and claims the benefit of Non-Provisional U.S. Pat. No. 11,333,264 B2, filed on Aug. 19, 2019, which claims priority to and the benefit of U.S. Provisional Application Ser. No. 62/804,051, filed on Feb. 11, 2019, entitled FILTRATION SYSTEM, each of which is incorporated herein by reference in their entirety and for all purposes.

FIELD

The present disclosure relates generally to water filter systems. More particularly, the disclosure relates to a manifold assembly for a whole house Point of Entry (POE) water filter system.

BACKGROUND

A whole house water filter system is a system capable of filtering all the water that enters a house from an external water network. These systems are also called Point of Entry (POE) systems because the water filters are usually installed before the water reaches the water heater, thus filtering both the cold and warm water in the house. The filtered water is then delivered to the faucets and other fixtures in the kitchen, bathrooms, laundry room, and the rest of the house.

SUMMARY

Pressure vessels for housing the filters of a POE system typically have a manifold section with molded ports for directing water from the external water network through the filter. Thus, if the manifold section becomes damaged, the entire pressure vessel needs to be replaced. Such molded-in configurations of the manifold can also make access to the filters inside the pressure vessel cumbersome and difficult. Furthermore, it is desirable for the manifold to have a shut-off capability so that water can be shut off from the pressure vessel for maintenance of the water filter system. Preferably, the shut-off operation by the manifold maybe selectively manually or automatically performed. It is also desirable to include the ability to bypass the filter system during activities such as irrigation.

Described herein is an all-in-one manifold assembly which is fabricated separately from and coupled to a pressure vessel of a water filter system. The manifold assembly can be maintained or replaced separately from the pressure vessel such that, if the manifold assembly is damaged, the entire pressure vessel does not need to be replaced. The manifold assembly advantageously includes a bypass, shut-off and normal operational setting. One or more sensors may be included in the manifold for measuring, for example, the flow, pressure, temperature, and/or turbidity of the water in the water filter system. The manifold assembly can be attached by pushing the manifold housing into ports of the pressure vessel and installing fasteners, making for easy installation, maintenance and replacement of the manifold assembly.

Further examples of the manifold assembly of this disclosure may include one or more of the following, in any suitable combination.

In one embodiment, the subject technology is directed to a manifold assembly for a water filter system. The manifold assembly includes a housing defining an internal passageway extending between an external inlet, an external outlet, an internal inlet and an internal outlet. The internal passageway also defines at least one valve port. In a preferred embodiment, the internal passageway defines two valve ports. At least one motor assembly mounts in the housing. The at least one motor assembly has a rotatable gear. At least one shut-off valve assembly mounts in the at least one valve port. Preferably, a shut-off valve assembly mounts in each valve port with a corresponding motor assembly. Each shut-off valve assembly includes a valve stem portion, a valve gear slideably coupled to the valve stem portion, and a knob coupled to the valve gear so that manual movement of the knob moves the valve gear along the valve stem portion to select between automatic and manual modes. In the automatic mode, the valve gear(s) engages the rotatable gear(s) so that the at least one motor assembly selectively rotates the valve stem portion between a normal operating position, a bypass position, and a shut-off position. In the manual mode, the valve gear(s) is disengaged from the rotatable gear(s) so that rotating the knob can be used to manually rotate the valve stem portion between the normal operating position, the bypass position, and the shut-off position.

The knob may include indicia so that a user can visually determine the position of the shut-off valve assembly. The valve gear preferably has a central large diameter portion with outer teeth. A proximal end stem extends from the central large diameter portion. A distal portion extends from the central portion for coupling to the valve stem portion. The distal portion includes a cylindrical sidewall defining a central bore and having at least one radially inward finger. The valve stem portion includes a proximal stem slideably fit in the central bore of the lower portion of the valve gear and defining at least one slot, preferably four slots, one slot each for capturing one of the radially inward fingers so that rotational orientation of the valve stem portion with respect to the valve gear and knob does not change when either of the valve gear or knob are rotated. At least one of the slots defines a proximal or upper detent and a distal or lower detent so that a user can feel the finger pop in and out of the detents to set the automatic mode when the finger is in the distal or lower detent and the manual mode when the at least one finger is in the proximal or upper detent. The valve stem portion may include a distal four-sided body with three sides each defining an opening and a fourth side being blocked. The manifold assembly also includes a controller for using the at least one motor assembly to change a position of the at least one shut-off valve assembly based upon user input from a control pad or wireless device. The manifold assembly can form one or more valve port for housing various sensors and additional devices such as a flow sensor.

In another embodiment, the subject technology is directed to a manifold assembly for a water filter system having a housing defining an internal passageway extending between an external inlet, an external outlet, an internal inlet and an internal outlet. The internal passageway defines two valve port. Two motor assemblies mount in the housing. A shut-off valve assembly mounts in each valve port. The shut-off valve assembly can be set in an automatic or a manual mode. In the automatic mode, the motor assemblies selectively rotate the shut-off valve assemblies between a normal operating position, a bypass position, and a shut-off position. In the manual mode, the motor assemblies disengage from the shut-off assemblies for manual rotation between the normal operating position, the bypass position, and the shut-off position.

In one embodiment, the POE system includes an integral controller with a graphical user interface display. The controller has a processor and memory for controlling operation of the manifold and other features as described herein. Preferably, the controller can communicate via WiFi and/or cellular as well as other similar technologies to provide updates and reminders among other features.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The disclosure will be more fully understood by reference to the detailed description, in conjunction with the following figures.

DETAILED DESCRIPTION

Figure 1A:
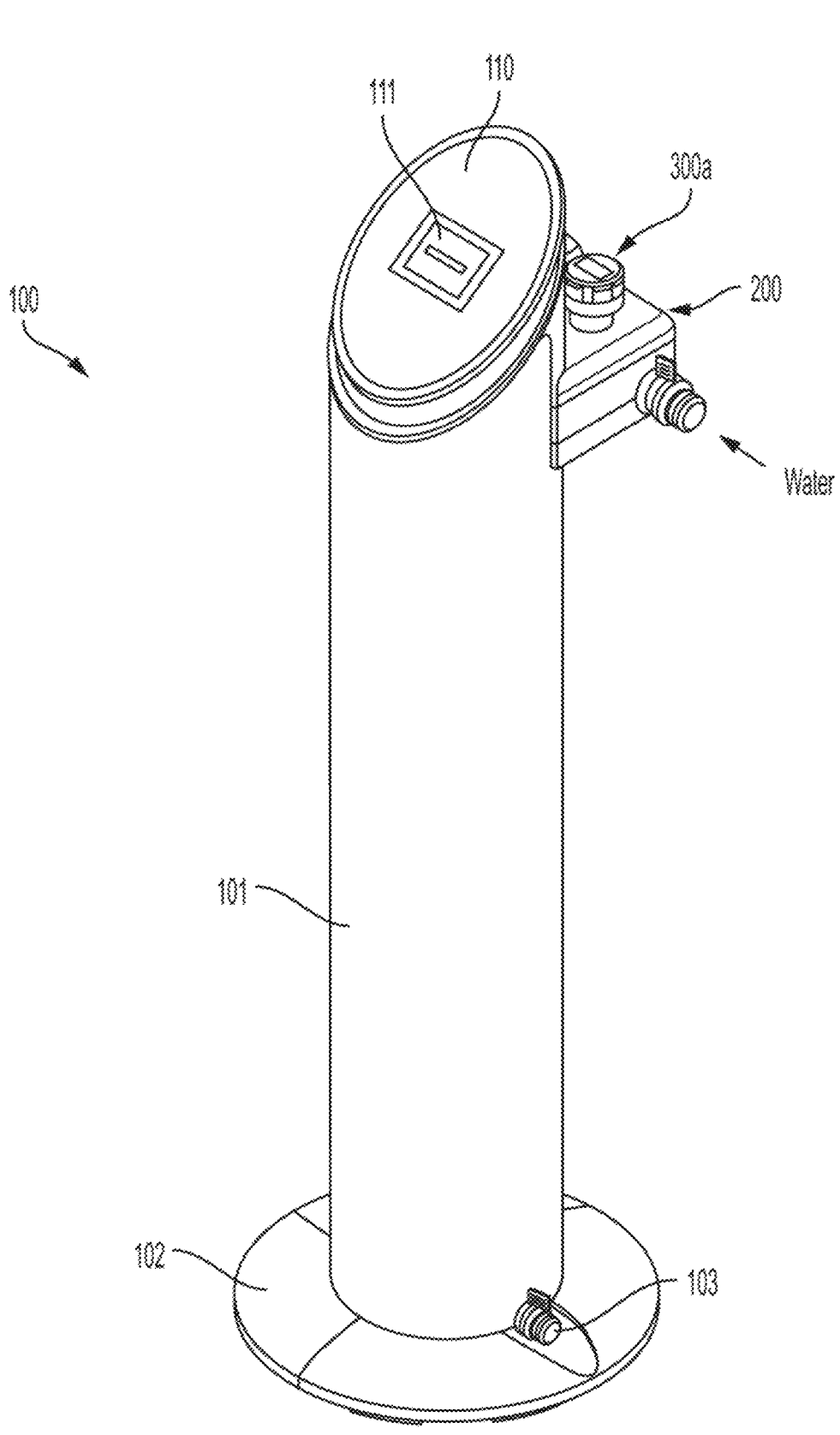
FIG. 1A is a perspective view of a water filter system with a manifold assembly in accordance with the subject technology.

In the description that follows, like components have been given the same reference numerals, regardless of whether they are shown in different examples. To illustrate example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As used in the specification and claims, for the purposes of describing and defining the subject technology, the terms "about" and "substantially" are used to represent the inherent degree of uncertainty that may be attributed to any quantitative comparison, value, measurement, or other representation. The terms "about" and "substantially" are also used herein to represent the degree by which a quantitative representation may vary from a stated reference without resulting in a change in the basic function of the subject matter at issue. "Comprise," "include," and/or plural forms of each are open ended and include the listed parts and can include additional parts that are not listed. "And/or" is open-ended and includes one or more of the listed parts and combinations of the listed parts. Use of the terms "top," "bottom," "underside," "beneath" and the like is intended only to help in the clear description of the present disclosure and are not intended to limit the structure, positioning and/or operation of the water filter system or manifold in any manner.

For a better understanding of the present disclosure, reference is made to FIGS. 1A-D which illustrate a whole house POE water filter system 100 for use with a manifold assembly 200 of the present disclosure. The water filter system 100 includes a cylindrical pressure vessel 106 which is stabilized in an upright position by a base 102. The cylindrical pressure vessel 106 is wrapped in a stainless steel cover 101. A top cover 110 provides access to one or more filter cartridges (not shown) in the interior of the pressure vessel 106. The water filter system 100 includes a lower fitting 103 as a drain port.

The top cover 110 includes a touch screen controller 111. Preferably, the controller 111 not only displays information but provides control of the manifold assembly 200. In one embodiment, the controller 111 includes a touch screen integrated with the top cover 110. The electronics for the controller 111 may be housed remotely or under the top cover 110. The controller 111 may communicate through wired and/or wireless channels.

A top portion 104 of the system 100 includes a cover hinge 114 that supports the top cover 110. The top portion 104 defines an inlet port 109a and an outlet port 109b in fluid communication with the filter cartridge (not shown) disposed inside the pressure vessel 106. The ports 109a, 109b are configured to connect to internal ports 210a, 201 b of the manifold assembly 200, as further described below. Projections 112 (FIG. 11D) extend from the pressure vessel 106 on either side of the ports 109a, 109b for securing the manifold assembly 200 to the system 100. A vertical frame 108 extends between the top housing portion 104 and the base 102. The vertical frame 108 may create the cover 101 from a sheet of stainless steel and provide support for the manifold assembly 200.

Figure 1B:
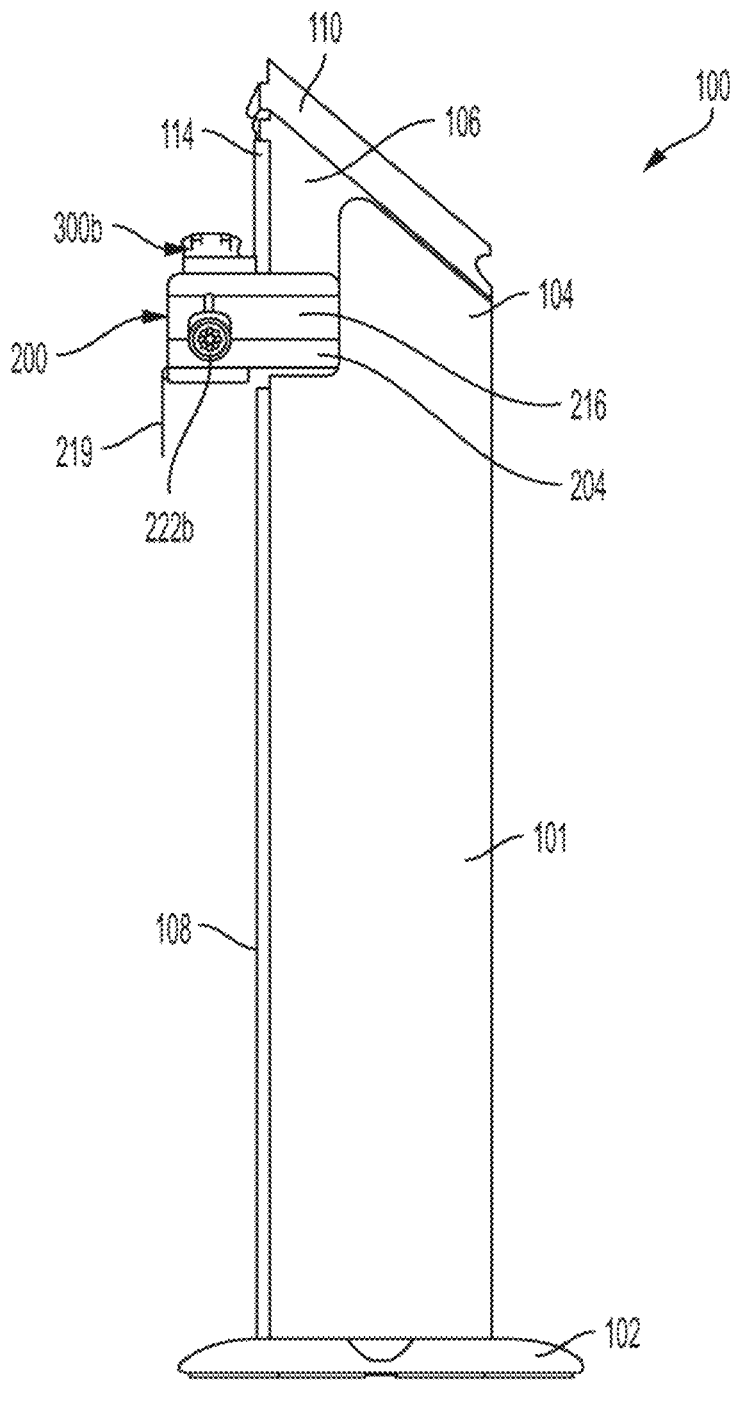
FIG. 1B is a side view of a water filter system with a manifold assembly in accordance with the subject technology.
Figure 1C:
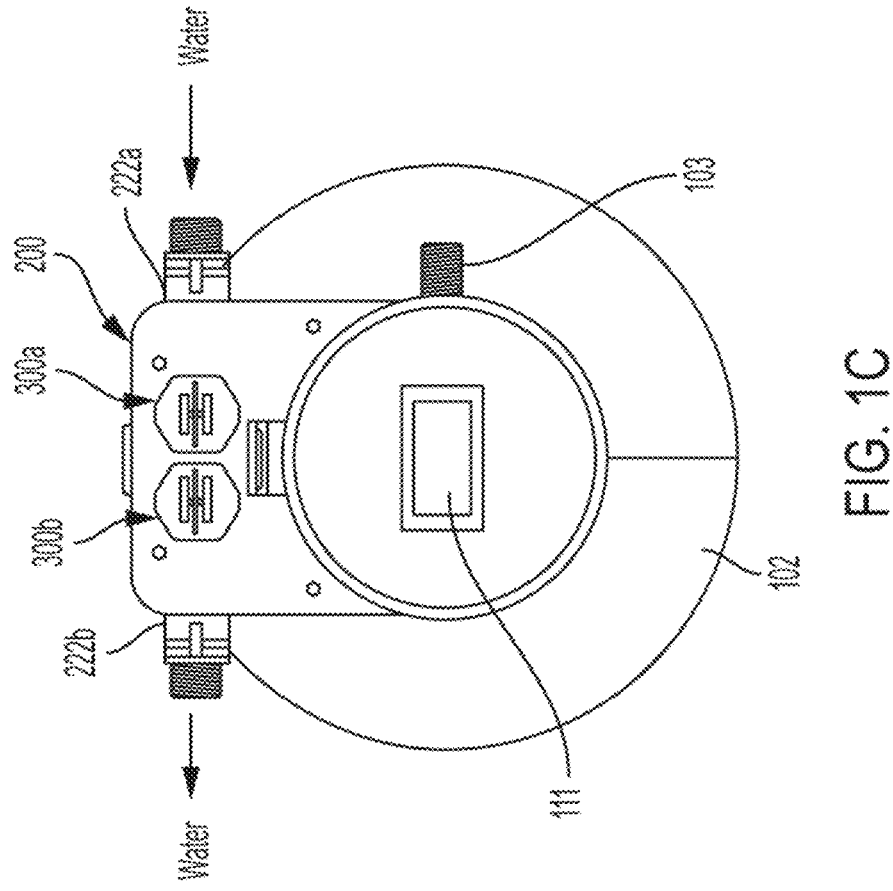
FIG. 1C is a top view of a water filter system with the manifold assembly in accordance with the subject technology.
Figure 1C:
Figure 1D:
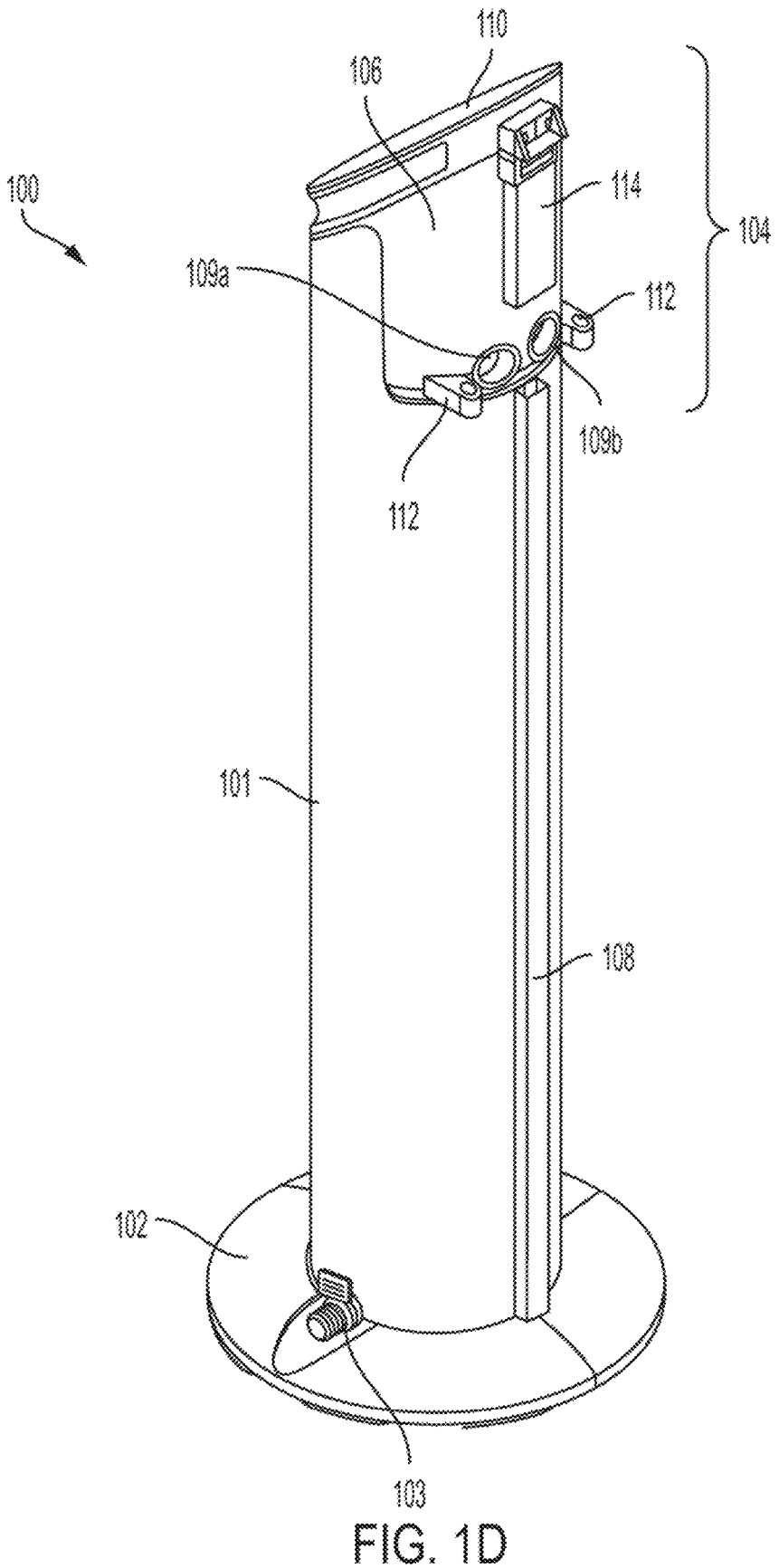
FIG. 1D is a rear perspective view of a water filter system with the manifold assembly removed in accordance with the subject technology.
Figure 2:
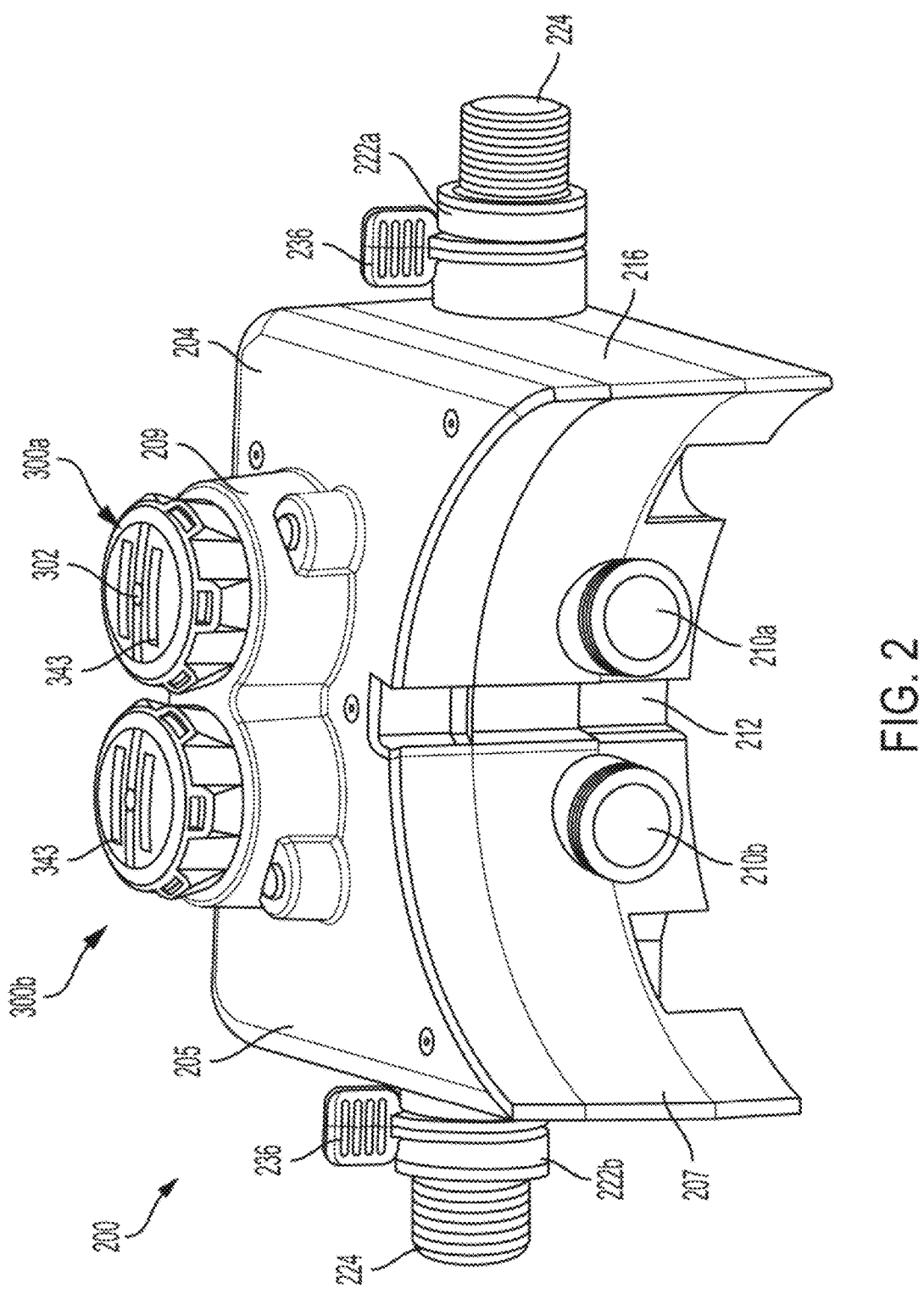
FIG. 2 is a perspective view of a manifold assembly in accordance with the subject technology.

Turning now to FIG. 2, the manifold assembly 200 of this disclosure for use with the water filter system 100 is shown in isolated perspective view. The manifold assembly 200 comprises a housing 204 having a curved surface 208 extending between two sides 216 of the housing 204 for fitting to the cylindrical outer surface of the pressure vessel 106. The curved surface 208 of the manifold assembly 200 includes an internal outlet port 210a and an internal inlet port 210b configured to be inserted into the corresponding ports 109a, 109b of the pressure vessel 106. When assembled together as shown in FIGS. 1A and 1B, the manifold assembly 200 is secured in place by fasteners (not shown) passed through the projections 112 into threaded bores 278 (see FIG. 3A) formed in the housing 204. A vertical slot 212 extends through the curved surface 208 between the ports 210a, 210b. The housing 204 has a top portion 205 and a bottom housing portion 207.

As best seen in FIG. 1B, the manifold assembly 200 is inserted against the inner pressure vessel 106 on the top housing portion 104 between the frame 108 and cover hinge 114. In another embodiment, the manifold assembly 200 is inserted against the inner pressure vessel 106 on the top housing portion 104 such that the vertical slot 212 can receive the frame 108 of the pressure vessel 106 for rotational stability. In another alternative embodiment, the vertical slot 212 receives the frame 108 and/or the hinge 114 for rotational stability.

Still referring to FIG. 2, the manifold assembly 200 includes an external inlet port 222a and an external outlet port 222b, each of which has fittings 224 for connection to the external water network. The manifold assembly 200 also includes two shut-off valve assemblies 300a, 300b that function in three modes of operation: normal; bypass; and shut-off. In normal mode, the incoming water is filtered. In bypass mode, the water passes through the manifold assembly 200 without filtering. In shut-off mode, incoming water is blocked for maintenance of the filter and the like. The shut-off valve assemblies 300a, 300b include knobs 302a, 302b for manual operation. Additionally, the shut-off valve assemblies 300a, 300b can be operated automatically by the controller 111 as described below.

Figures 3A, 3B:
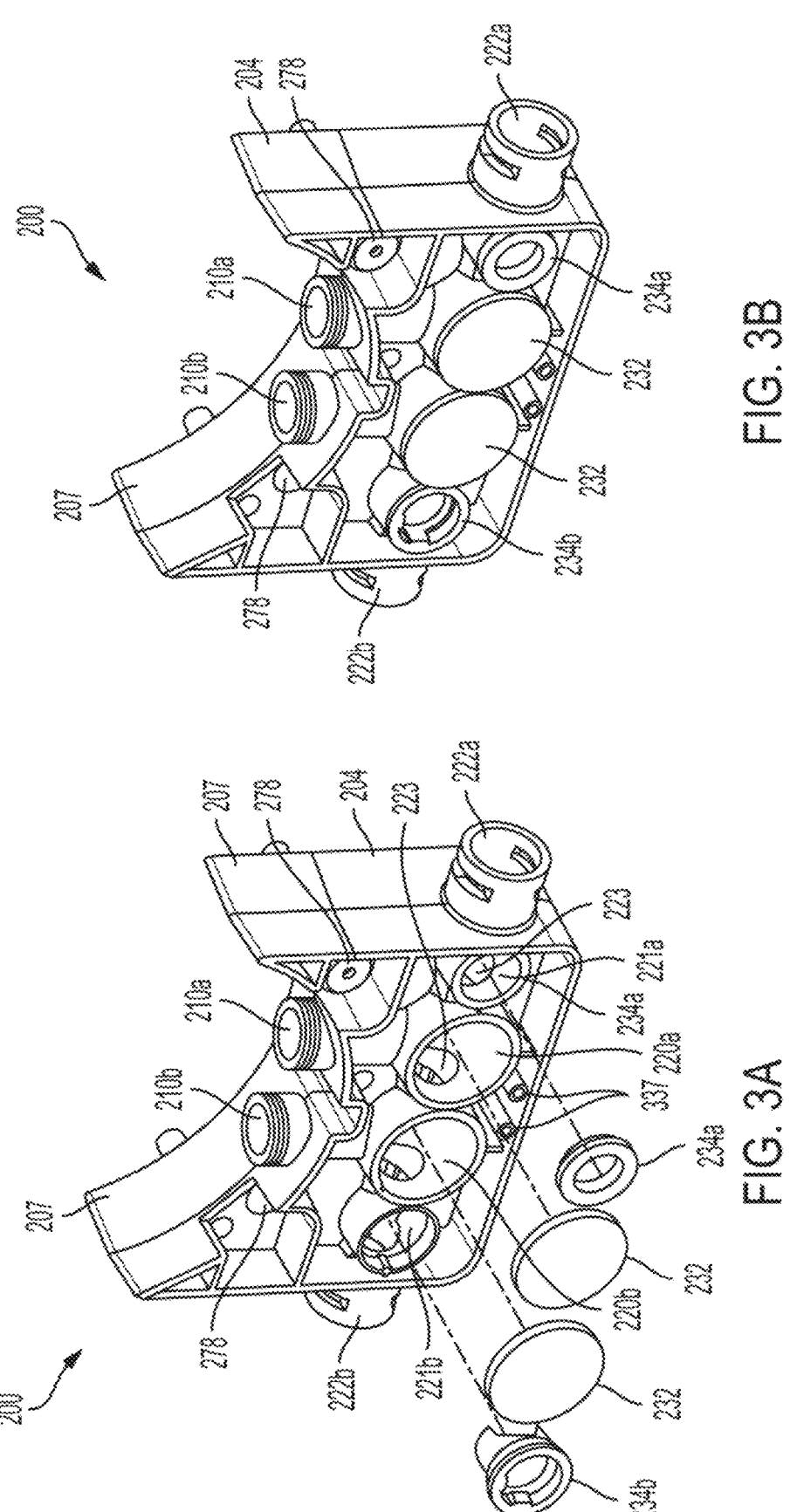
FIGS. 3A-K illustrate a series of assembly steps for a manifold assembly, in accordance with the subject technology.

FIGS. 3A-K illustrate a series of steps for assembly of the manifold assembly 200 in accordance with the subject technology. Referring now particularly to FIGS. 3A and 3B, bottom perspective views of the bottom portion 207 of the housing 204 are shown. The bottom housing portion 207 of the housing 204 forms an internal passageway 223 between the inlet port 222a and the outlet port 222b. The internal ports 210a, 210b are also in fluid communication with the internal passageway 223. The internal passageway 223 includes two vertical valve ports 220a, 220b and two vertical sensor ports 221a, 221b.

The inlet valve port 220a is in fluid communication with inlet port 222a via the sensor port 221a. The inlet valve port 220a is also in fluid communication with the internal outlet port 210a. Similarly, the outlet valve port 220b is in fluid communication with the internal inlet port 210b as well as the outlet port 222b via the sensor port 221b. The passageway 223 also extends between the two vertical valve ports 220a, 220b. The valve ports 220a, 220b each hold a shut-off valve assembly 300 (see FIGS. 3C, 3E, 3F, 5A, and 5B) for selectively opening and closing sections of the internal passageway 223. For example, in an operational position, water from the water network is configured to flow, for example, from external inlet port 222a to sensor port 221a to valve port 220a to outlet port 210a into the pressure vessel 106, and return after filtering through the internal inlet port 210b to valve port 220b to sensor port 221b to external outlet port 222b into the water network. The sensor ports 221a, 221 b can hold flow, pressure, temperature, turbidity and/or other sensors for monitoring fluid in the internal passageway 223.

In the assembly step of FIGS. 3A and 3B, caps 232 are inserted to enclose the valve ports 220a, 220b of the manifold assembly 200. Sensor port caps 234a, 234b are also inserted into the sensor ports 221a, 221b. Various sensors or other devices (not shown) are inserted into the sensor ports 221a, 221b via the caps 234 and communicate signals to the controller. Alternatively, one or both sensor ports 221a, 221 b may simply be unused and capped to seal and maintain the internal passageway 223 in a fluid tight manner.

Figures 3C, 3D:
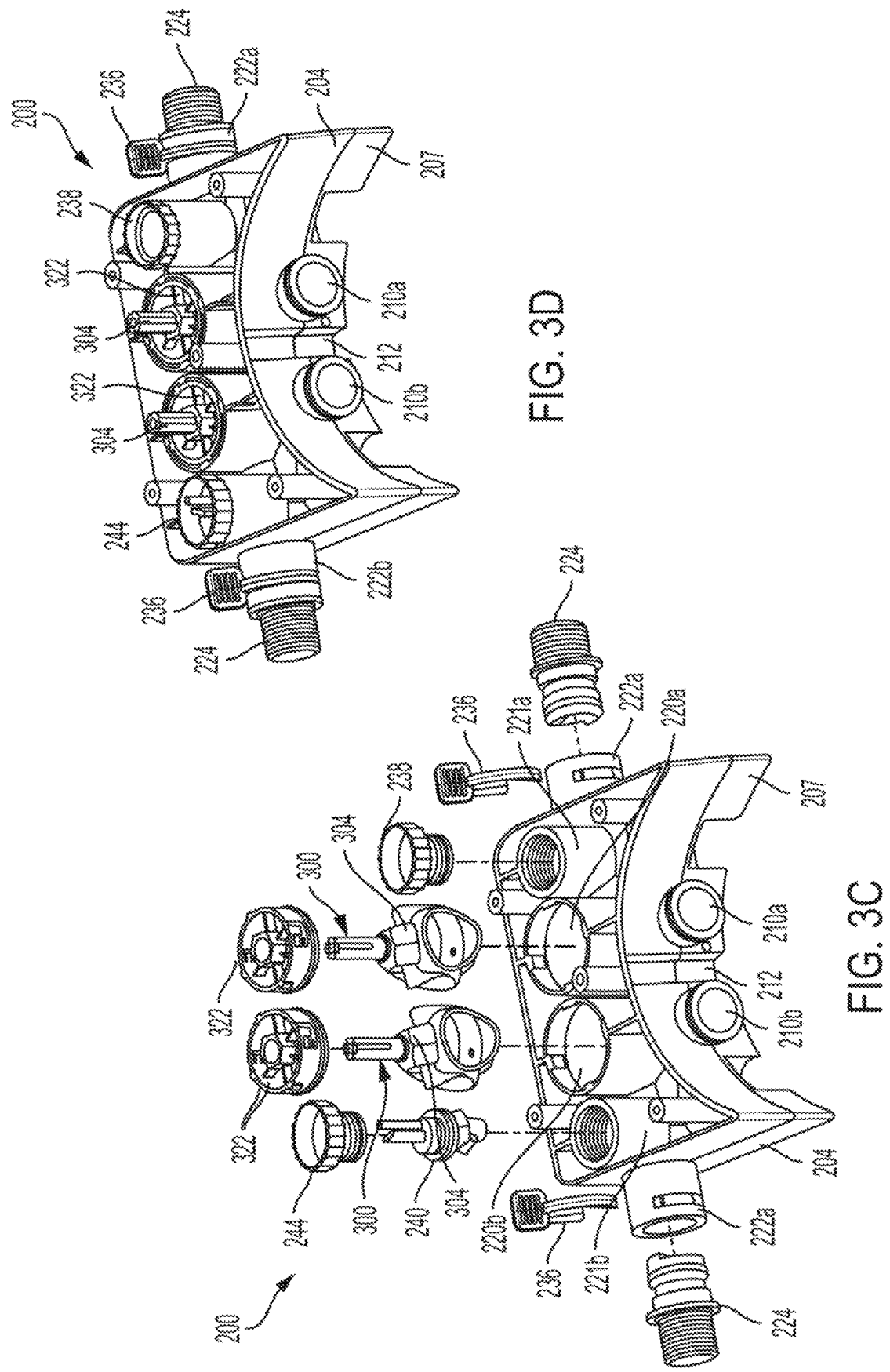

In the assembly step of FIGS. 3C and 3D, upper perspective views of the bottom portion 207 of the housing 204 are shown. The fittings 224 are inserted into the external ports 222a, 222b and held in place with retainer clips 236. In this embodiment, a blank port plug 238 is inserted into the unused port 221a. A flow sensor 240 is secured within the flow sensor port 221b with a lock nut 244. The flow sensor 240 may be wired to or wirelessly send signals to the controller.

Assembly of the shut-off valve assemblies 300a, 300b in each valve port 220a, 220b is also shown in FIGS. 3C-31. Prior to describing FIGS. 3C-31 in detail, it is proper to turn to FIGS. 5A-5E for a description of a shut-off valve assembly 300 because review now of the structure of the shut-off valve assembly 300 will facilitate understanding when the narrative returns to the assembly drawings. One of the shut-off valve assemblies 300 for insertion into a valve port 220a, 220b of the manifold assembly 200 is illustrated in a perspective view, side and cross-sectional view, respectively if FIGS. 5A-5C, respectively. Each valve assembly 300 includes a knob 302 coupled to a valve gear 305. A perspective view of the valve gear 305 is shown in FIG. 5D. The valve gear 305 slideably couples to a valve stem portion 304, which is shown in isolation in FIG. 5E.

The knob 302 has a central hole 340 for receiving a fastener 339. The knob's undulating outer circumference 342 makes for easy gripping by the user to pull and turn the shut-off valve assembly 300. Indicia 343 is provided on the knob 302 that may include instructions and/or orientation markings so the user can visually determine the setting of the shut-off valve assembly 300.

The valve gear 305 includes a central large diameter portion 306 having outer teeth 308. A top end stem 350 extends upward from the central large diameter portion 306. The top end stem 350 has a threaded central bore 351 for receiving the screw 339 to couple the valve gear 305 and knob 302 together. A lower or distal portion 354 extends downward from the central portion 305. The lower portion 354 couples to the valve stem portion 304. The lower portion 354 is a largely cylindrical sidewall 355 that defines a central bore 356. The sidewall 355 also defines an annular flexure slot 357 (see FIG. 5C) so that four radially inward fingers 358 can deflect outward.

Figure 5A:
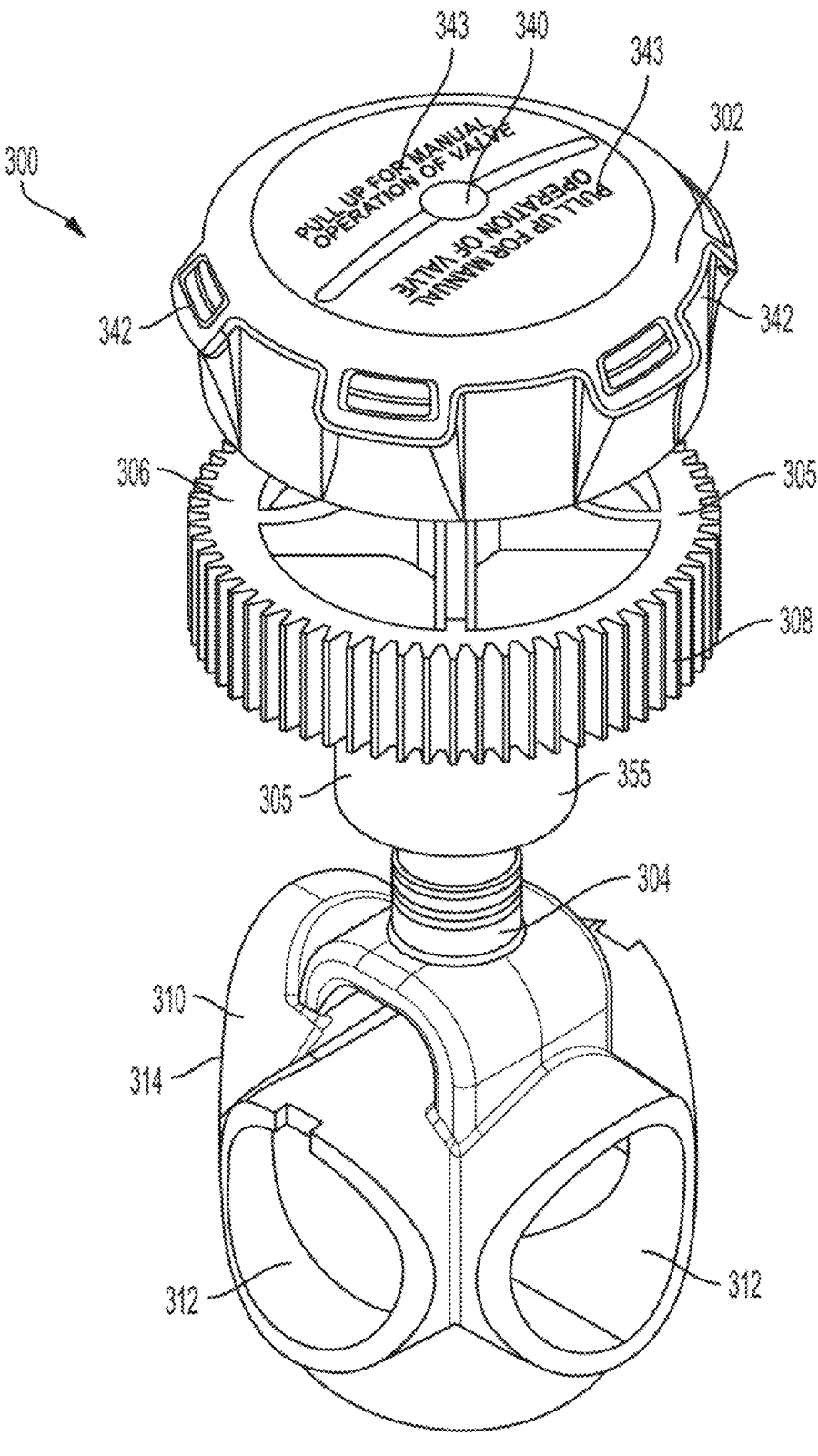
FIGS. 5A-5C are perspective, side and cross-sectional views, respectively, of a shut-off valve assembly for the manifold assembly of FIG. 2 in accordance with the subject technology.
Figures 5B, 5C:
Figure 5E:
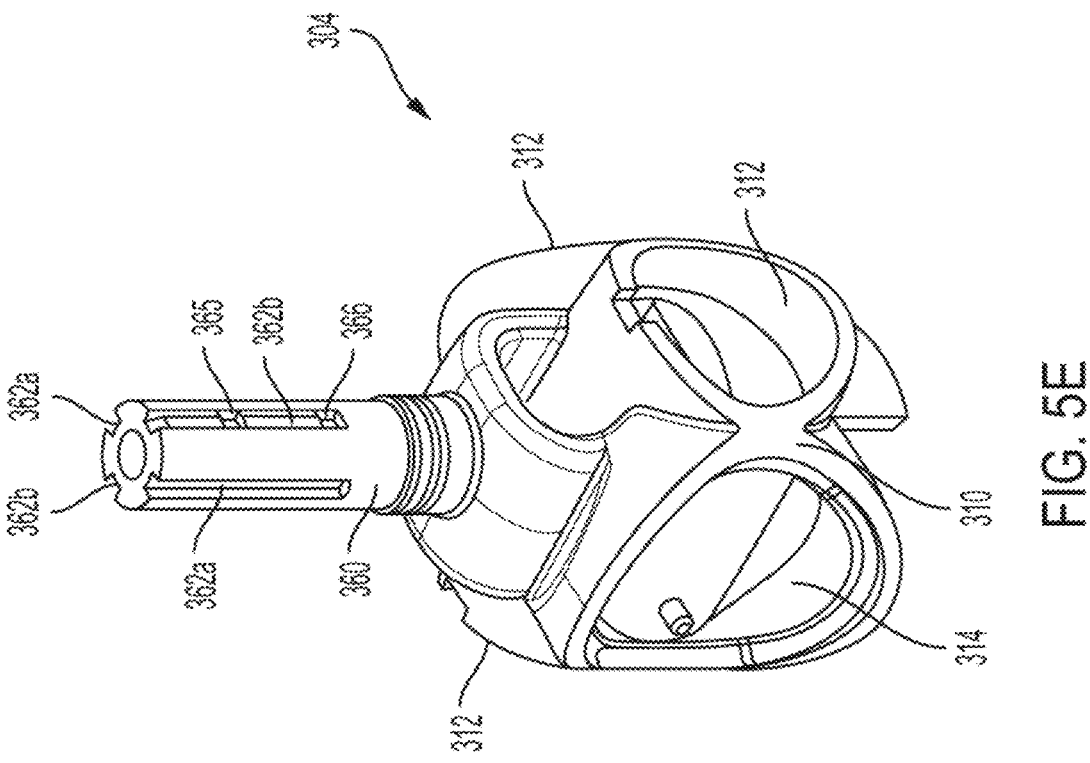
FIG. 5E is a perspective view of a valve portion of the shut-off valve assembly of FIGS. 5A-5C in accordance with the subject technology.

Referring now to FIG. 5E, a top perspective view of the valve stem portion 304 is shown in isolation. The valve stem portion 304 includes a top stem 360 sized to slideably fit in the central bore 356 of the lower portion 354 of the valve gear 305. The top stem 360 approximates a quatrefoil in cross-section by having two sets of equally spaced opposing slots 362a, 362b. The top stem 360 also has a sealing ring 361.

One set of slots 362a are guide slots for capturing two opposing deflectable fingers 358. The fingers 358 are sized and configured to be captured in the guide slots 362a so that the rotational orientation of the valve stem portion 304 with respect to the valve gear 305 and knob 302 does not change when either of the valve gear 305 or knob 302 are rotated. Additionally, when the knob 302 is pulled upward or pushed downward, the guide slots 362a and fingers 358 again prevent relative rotation of the components of the shut-off valve assembly 300.

The other set of slots 362b also serve as guide slots for capturing two opposing deflectable fingers 358. However, the detent slots 362b are shallower to normally deflect the fingers 358 radially outward. Each detent slot 362b forms an upper detent 365 and a lower detent 366. The detents 365, 366 are radially inward depressions that capture the deflectable fingers 358. When in the detents 365, 366, the fingers 358 are undeflected. By pushing and pulling the knob 302, the user can feel the fingers 358 pop in and out of the detents 365, 366 to set a desired operational position of the shut-off valve assembly 300 as described further below.

Still referring to FIGS. 5A-5E, the top stem 360 is attached to a four-sided body 310. Three sides 311 of the body 310 define an opening 312, each one of the openings 312 is in fluid communication with the other two openings 312. The openings 312 are sized and configured to approximately match the internal passageway 223 of the manifold assembly 200. The fourth side 314 of the body 310 is blocked.

Referring again to FIGS. 3C and 3D, initial assembly of the shut-off valve assemblies 300 in the manifold assembly 200 is shown. Each valve stem portion 304 is inserted into the respective valve port 220a, 220b so that the openings 312 of the four-sided body 310 aligns with the internal passageway 223. A valve retaining nut assembly 322 slides over the stem 360 and threads into the respective valve port 220a, 220b to prevent or limit upward motion of the valve stem portion 304. The valve retaining nut assembly 322 also seals the valve ports 220a, 220b of the manifold assembly 200 so that fluid does not leak from the internal passageway 223.

Figures 3E, 3F:
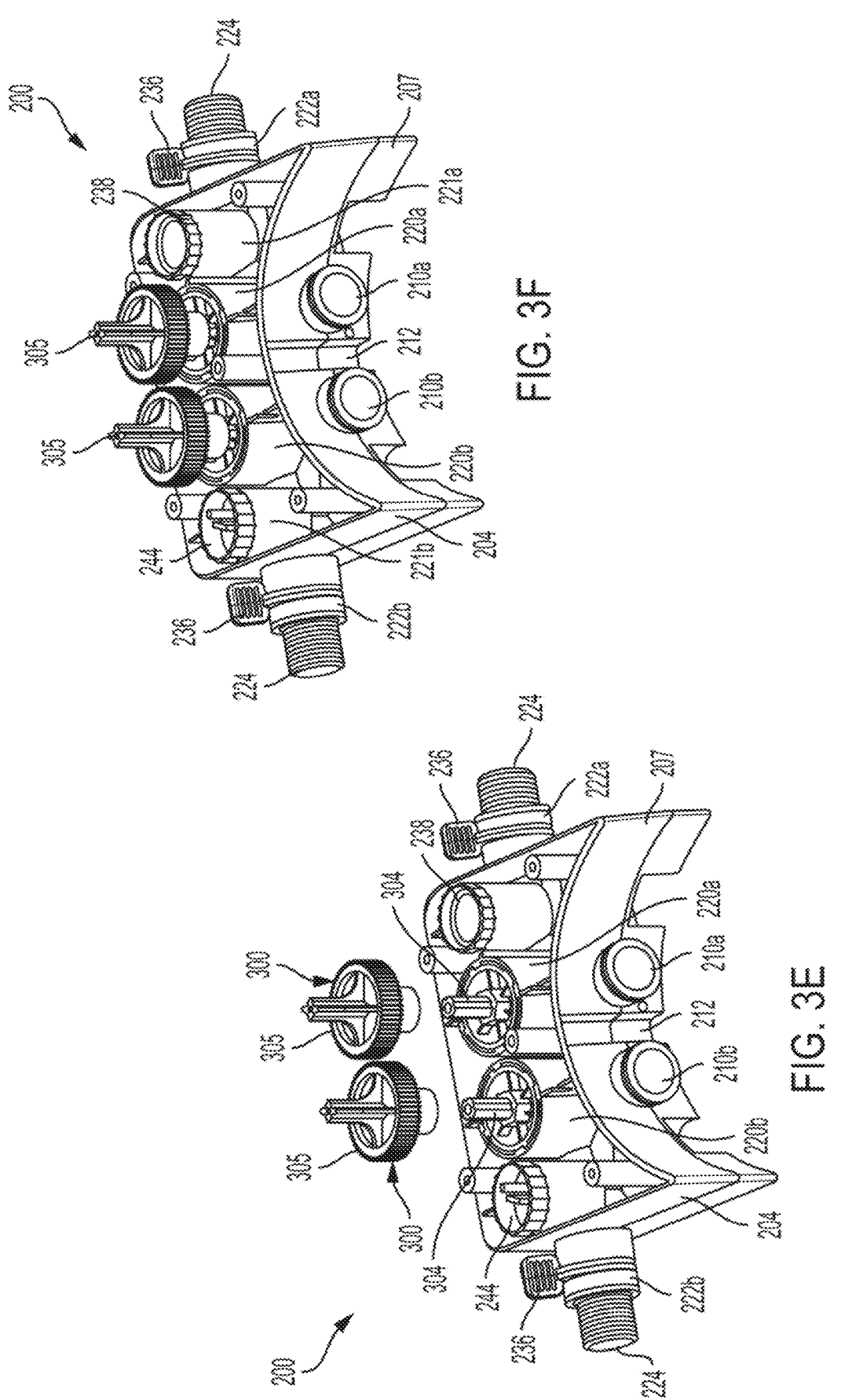

In the next assembly step of FIGS. 3E and 3F, the valve gear 305 is coupled to the valve stem portion 304 of each valve assembly 300 with the deflectable fingers 358 in the slots 362a, 362b. Unlike the body 310, the valve gear 305 is free to move up and down on the stem 360 so that the fingers 358 can be positioned in either the upper detent 365 or the lower detent 366.

Figures 3G, 3H:
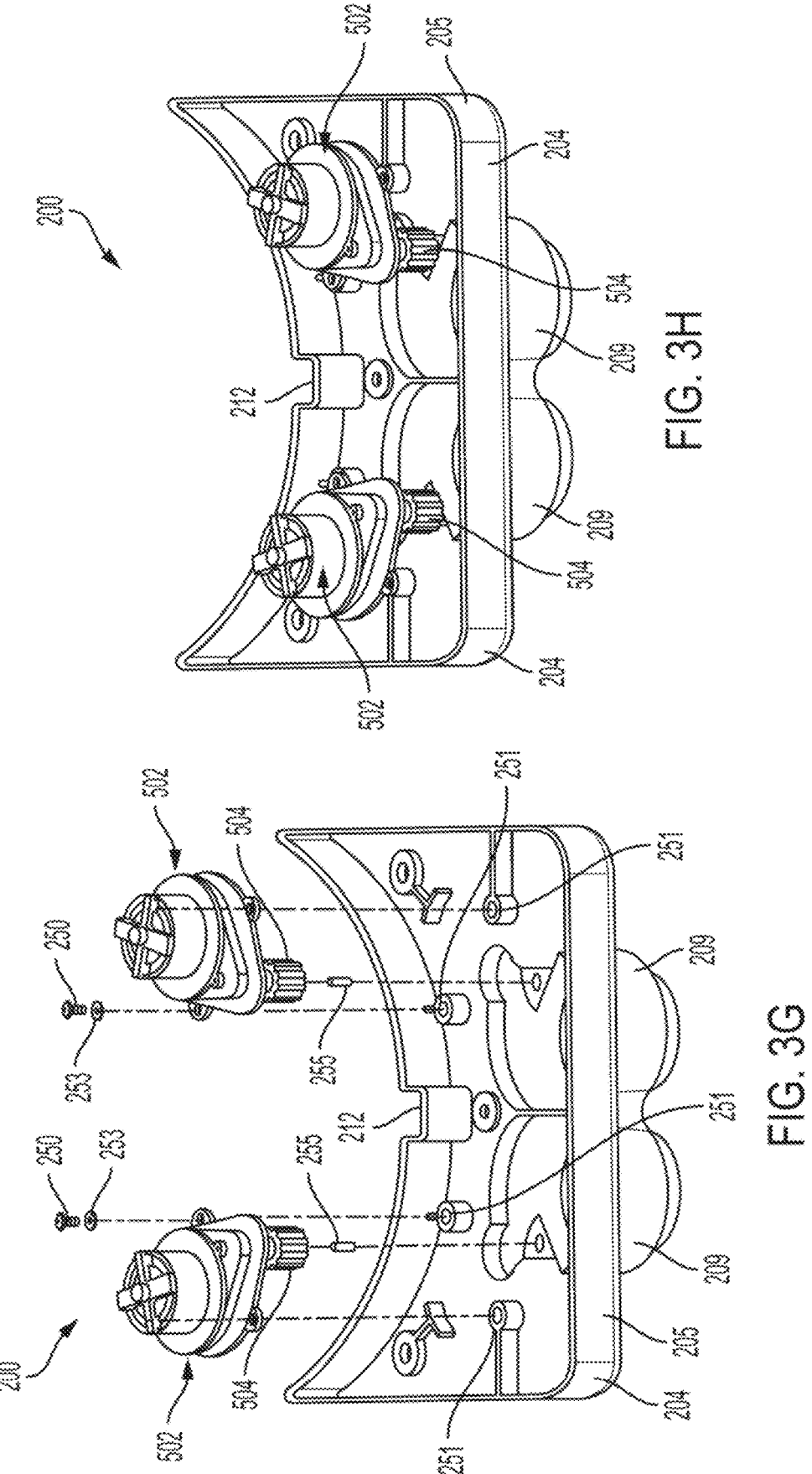
Figure 3I:
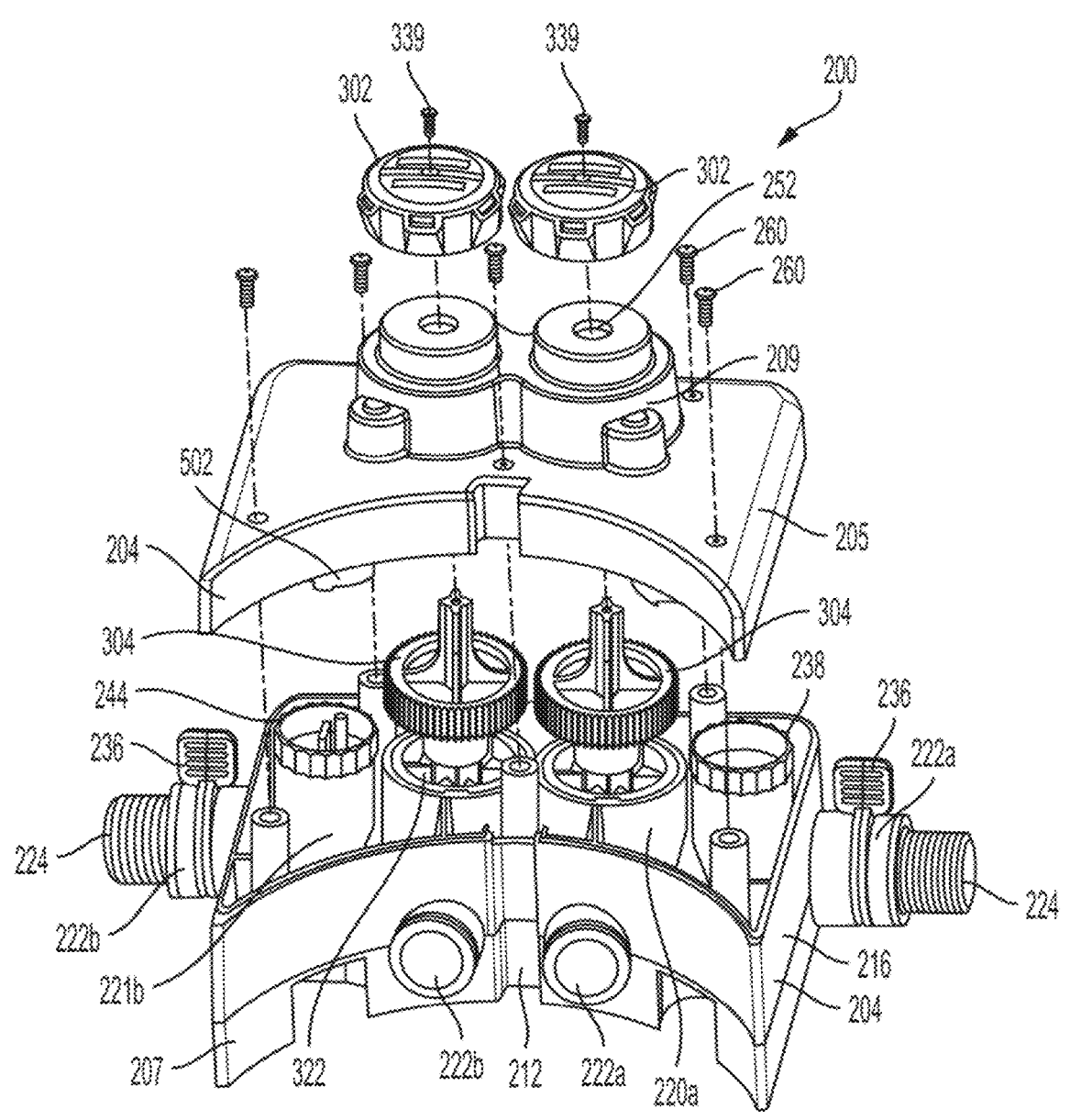

In the next assembly step of FIGS. 3G and 311, perspective underside views of the top portion 205 of the housing 204 are shown. Motor assemblies 502 are mounted in the top portion 205 with screws 250 in mounting holes 251. Preferably, the screws 250 carry washers 253. The motor assemblies 502 communicate with and are driven by the controller. Each motor assembly 502 drives a motor gear 504 that selectively interacts with the teeth 308 of the valve gear 305 when the fingers 358 are in the lower detent 366. The motor gear 504 rotates about a pin 255 secured in a pivot hole 257 of the top portion 205.

In the next assembly step of FIG. 31, a partially exploded view of the manifold assembly 300 is shown. With the motor assemblies 502 secured in place, the top portion 205 is fastened to the bottom housing portion 207 with fasteners 260 such that the valve stems 304 extend through stem openings 252 in the top portion 205. The knobs 302 are then mounted on each valve portion 304 with fasteners 339 to complete the manifold assembly 300 as shown in FIG. 2.

Figure 3K:
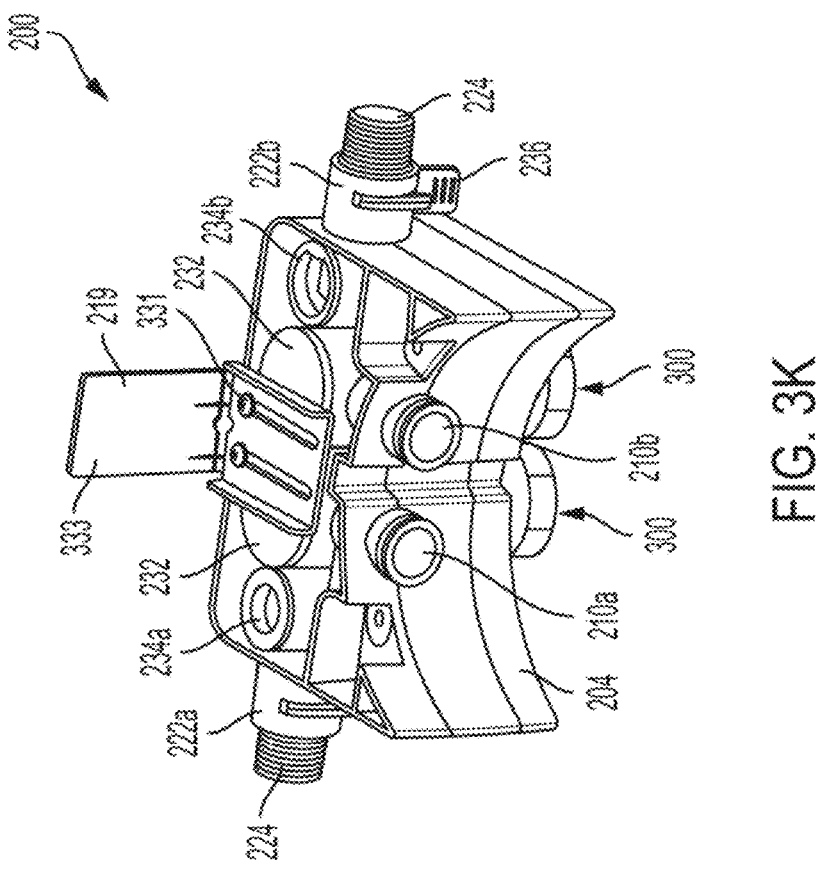
Figure 3J:
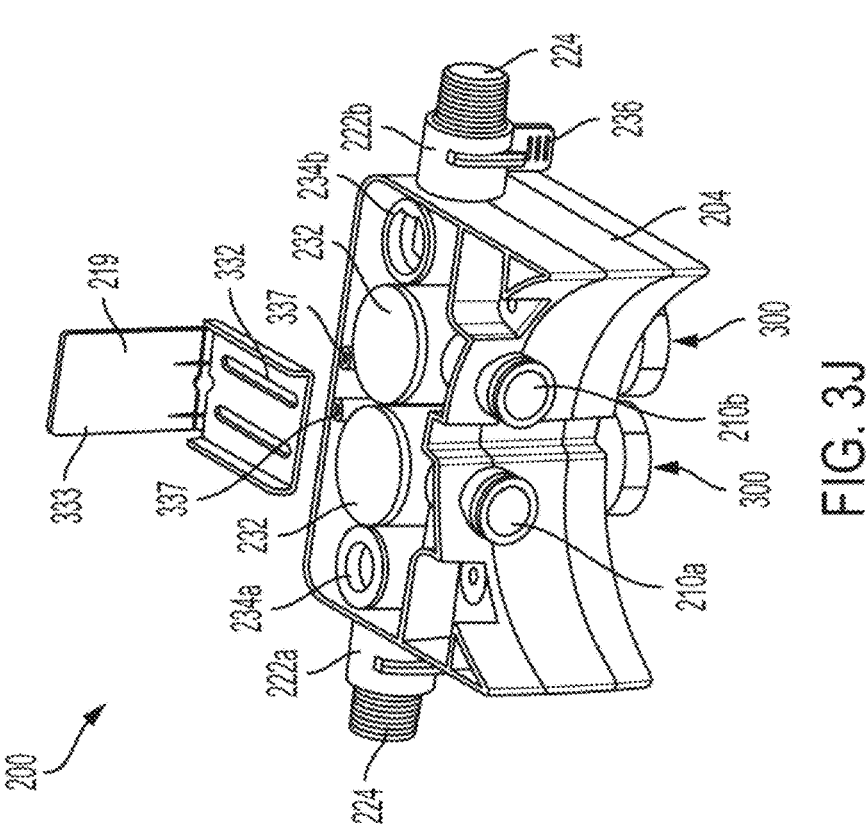

In a final assembly step of FIGS. 3J and 3K, a mounting bracket 219 is attached to threaded shoulders 337 of the bottom housing portion 307 of the manifold assembly 200 with fasteners 331. The mounting bracket 219 has slots 332 so that a vertical portion 333 may be set flush against an adjacent surface (not shown). Additional holes may be drilled in the vertical portion 333 to receive fasteners (not shown) so that the manifold assembly 200 and, in turn, the POE system can be secured in place with reduced likelihood of being inadvertently knocked over. It is envisioned that the controller, sensor(s), and/or motor assemblies 502 have wiring (not shown) extending from the bottom housing portion 307 for power and the like. The mounting bracket 219 secures the water filter system 100 to a wall or other support structure. The manifold assembly 200 receives power and/or other electrical signals from wiring (not shown) or may run on battery power.

Figure 4A:
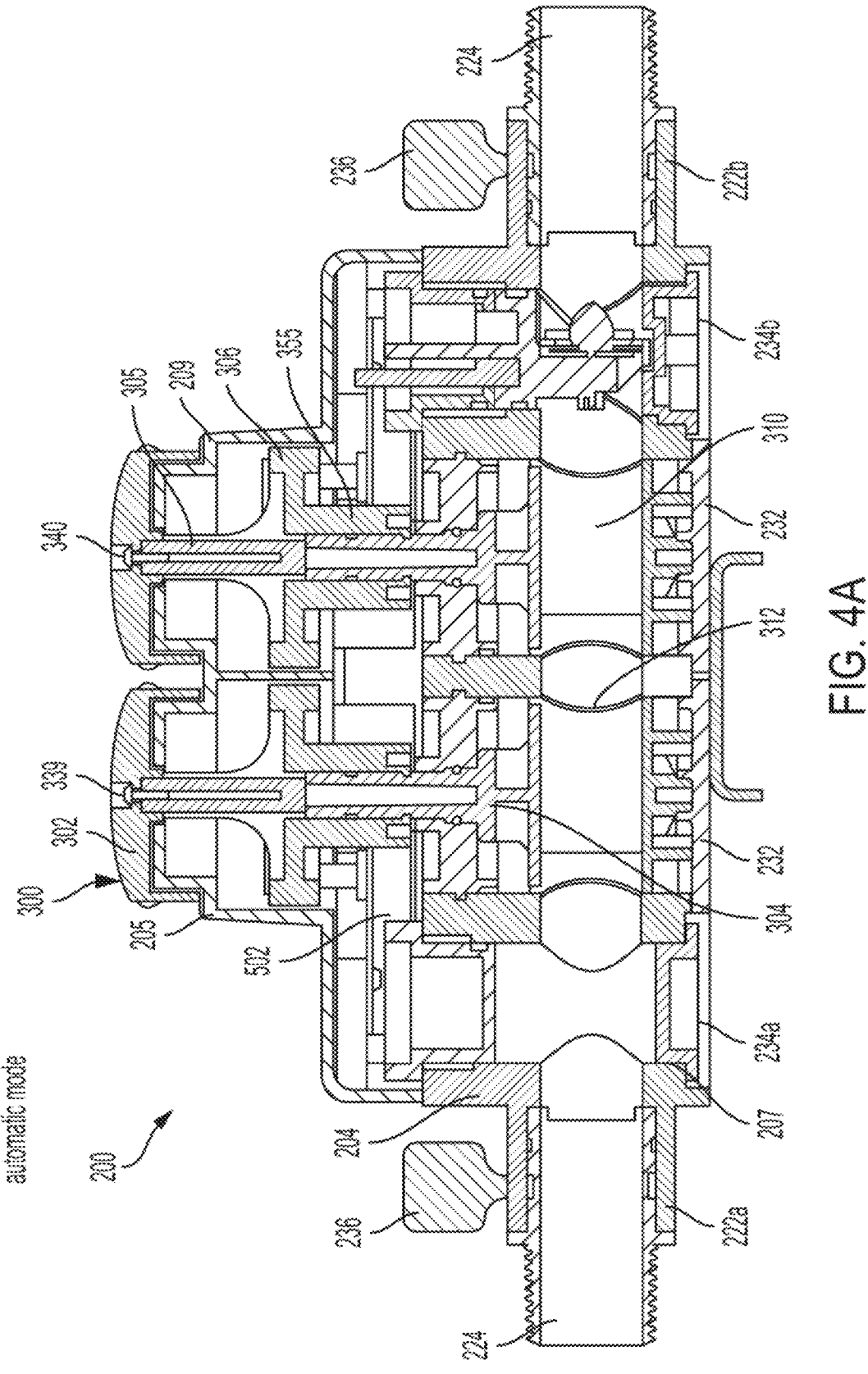
FIG. 4A is a cross-sectional views of the manifold assembly in an automatic mode and operational position in accordance with the subject technology.

Referring now to FIG. 4A, the manifold assembly 200 is shown in cross-section fully assembled. The manifold assembly 200 may be operated in two different modes: automatic mode; and manual mode. Also referring to FIGS. 4B and 4C, cross-sectional views of a portion of the manifold assembly 200 are shown in automatic mode and manual mode, respectively. Advantageously, each valve assembly 300 in the manifold assembly 200 saves on cost and complexity by being interchangeable. The knobs 302 are used to switch between the manual and automatic modes of operation.

Figure 4B:
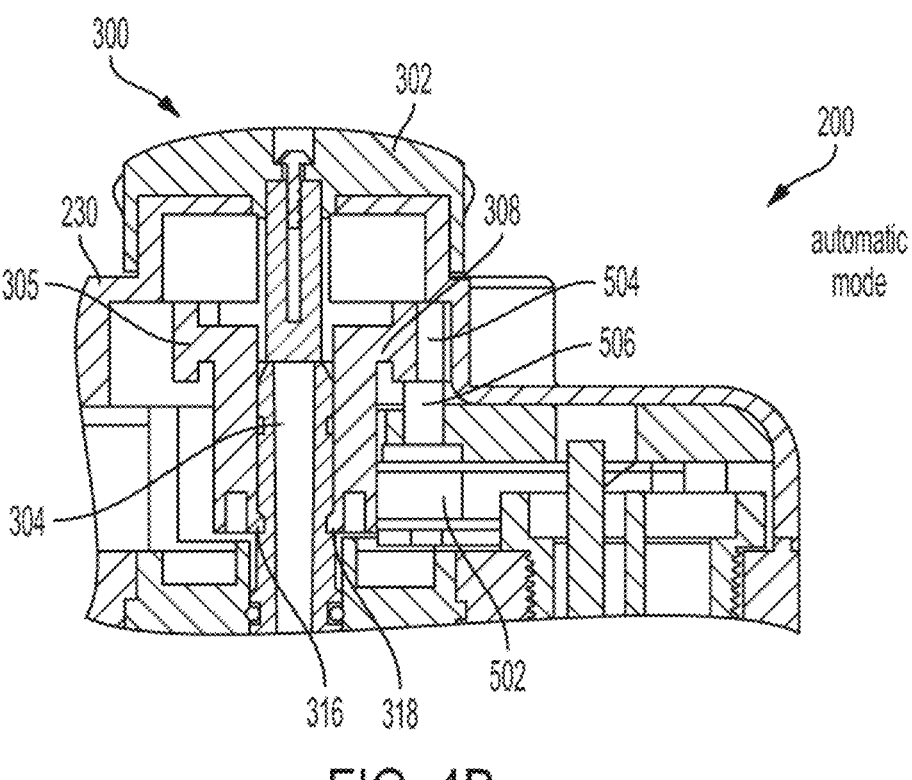
FIGS. 4B and 4C are more detailed partial cross-sectional views of the manifold assembly in an automatic mode and a manual mode, respectively, in accordance with the subject technology.
Figure 5D:
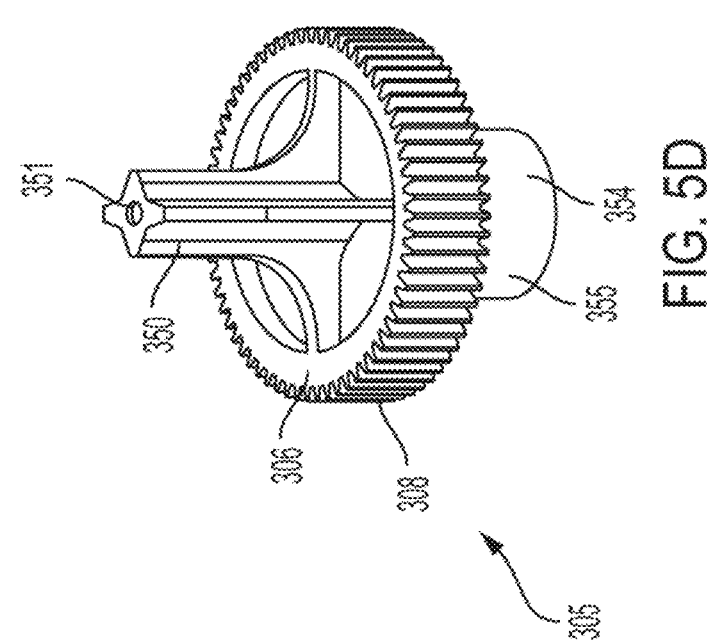
FIG. 5D is a perspective view of a gear portion of a shut-off valve assembly of FIGS. 5A-5C in accordance with the subject technology.

In the automatic mode of FIGS. 4A and 4B, the motor assembly 502 may receive control signals from the controller 111. Based upon certain circumstances, the controller 111 may automatically switch the manifold assembly 200 between the modes of FIGS. 6A-C as described below. As can be seen in FIGS. 4A and 4B, the motor gear 504 is engaged with the teeth 308 of the gear portion 305. Thus, when the controller drives the motor gear 504, the gear portion 305 turns. As a result, the valve portion 304 turns to the desired position. Sensors may also be used to verify proper positioning of the valve portion 304.

The user can verify that the manifold assembly 200 is in the automatic position by pushing down on the shut-off valve assembly 300. When the knob 302 is pushed downward by the user, the valve gear 305 moves downward so that the deflectable fingers 358 come to rest in the lower detent 366. This aligns the outer teeth 308 of the valve gear 305 to engage the corresponding teeth 504 on the motor gear 506. Although downward movement of the knob 302 is limited by a top portion 205 of the manifold assembly 200, the deflectable fingers 358 of the valve gear 305 popping into the lower detent 366 on the valve stem portion 304 provide tactile feel to the user to communicate that the knob 302 is properly in the automatic mode position.

Figure 4C:
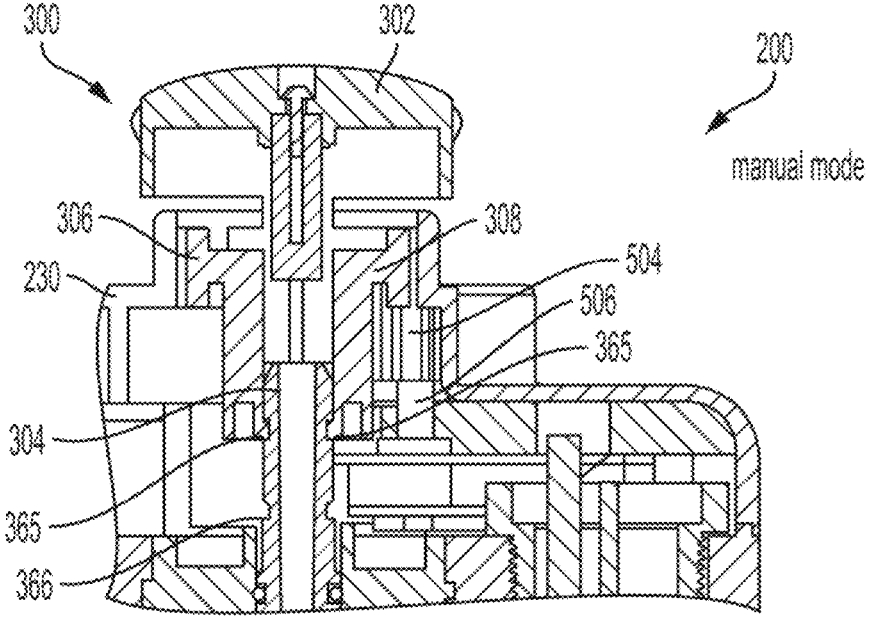

However, as shown in FIG. 4C, if the knob 302 is pulled upward by the user, the respective valve assembly 300 is put into a manual mode such that manual rotation of the knob 302 controls the position of the valve assembly 300. As noted above, indicia 343 may be provided on the knob 302 and/or the top portion 205 so that the user can visually set the position of the knob 302. When the knob 302 is pulled upward, the fingers 358 deflect out of the lower detent 366 on the valve stem portion 304 and slide upward in the slots 362a, 362b until the fingers 358 engage the upper detent 365 on the valve stem portion 304. The valve gear 305 moves up into a raised portion 209 of the top portion 205, which provides a hard stop to the central portion 306 but the user gets a tactile response when the fingers 358 engage the upper detent 365 to indicate the desired manual position. In either case, the outer teeth 308 of the valve gear 305 rise above and disengage from the teeth 504 of the motor gear 506. Thus, the position of the valve assembly 300 is solely controlled by manual rotation of the knob 302 so that the knob 302 can be manually rotated to a desired position.

To return to the automatic mode, the knob 302 is simply pushed downward so that the deflectable fingers 358 ride down the slots 362a, 362b and re-engage the lower detents 366 and, thus, the valve gear 305 lowers to become re-engaged with the motor gear 506. A sensor, such as a Hall Effect sensor, may be used as feedback, or internal sensors on the motor assembly 502 can be used to properly align and/or verify that the shut-off valve assemblies 300 are in the proper automatic mode and/or manual operation position.

Figure 6A:
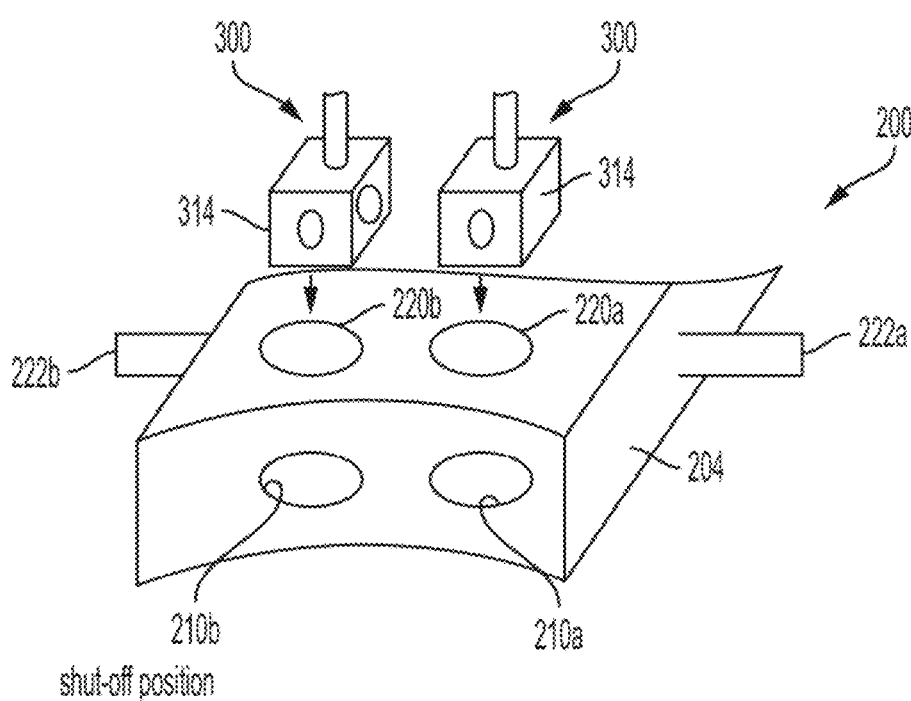
FIGS. 6A-C schematically illustrate shut-off, bypass and operating modes, respectively, of the manifold assembly, in accordance with the subject technology.
Figure 6B:
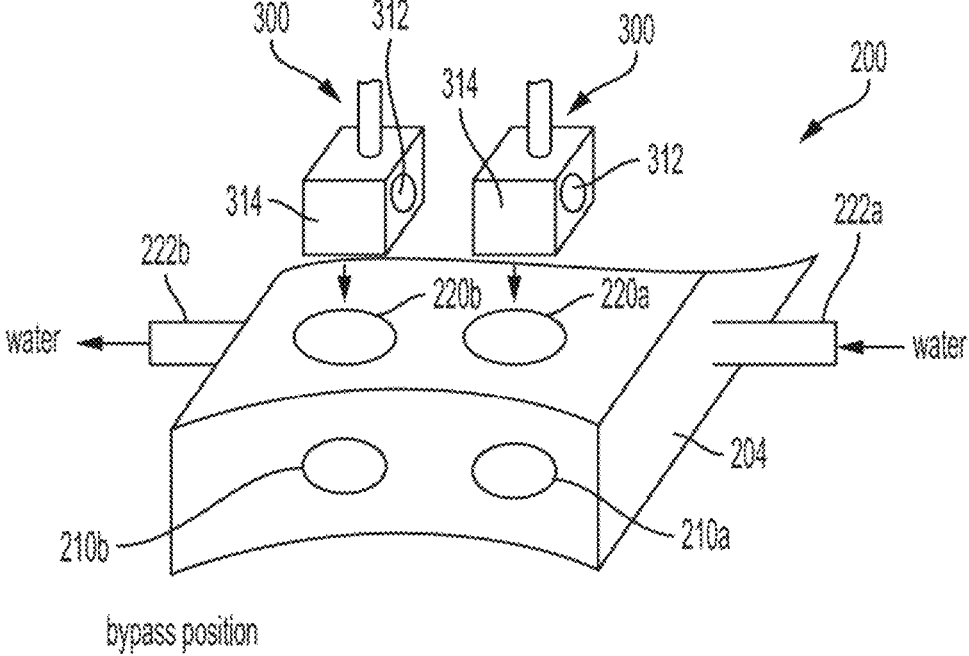
Figure 6C:
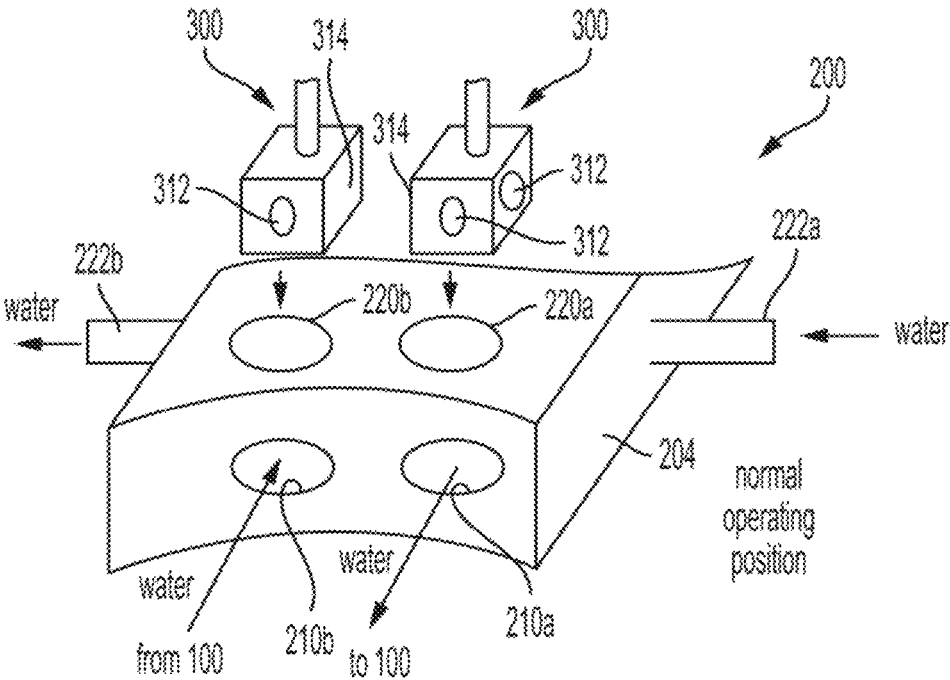

When the valve assemblies 300 are inserted into the valve ports 220a, 220b of the manifold assembly 200, the manifold assembly 200 can be set to three different positions, as shown schematically in FIGS. 6A-C. As shown in FIG. 6A, the manifold assembly 200 is in a shut-off position, in which the blocked portions 314 of the body 310 of the valve assemblies 300 are rotated within the valve ports 220a, 220b to face the external ports 222a, 222b. As a result, the flowpath from the water network into or out of the manifold assembly 200 is blocked. The shut-off position is useful for maintenance of the filter and like maintenance operations. It is noted that only facing the blocked portion 314 of the body 310 in valve portion 220a to the external inlet 222a may be used to shut off flow.

In the bypass position, shown in FIG. 6B, the blocked portions 314 of the valve assemblies 300 are rotated within the valve ports 220a, 220b to face the internal ports 210a, 210b. Thus, water can flow from the water network through the external port 222a and through the internal passageway 223, including the valve ports 220a, 220b, and out of the external port 222b, while being prevented from flowing into or out of the pressure vessel 106 through the internal ports 210a, 210b. Advantageously, the bypass position effectively allows taking the filter offline without otherwise interfering with water flow in the house water network.

In the normal operational position, shown in FIG. 6C, the blocked portions 314 of the valve assemblies 300 are rotated within the valve ports 220a, 220b to face each other. Thus, water flows into inlet port 222a through the first body 310 of the valve assembly 300 to pass out the internal outlet port 210a into the pressure vessel 106 for filtering. After passing through the filter, the filtered water re-enters the internal passageway 223 via the internal inlet port 210b and passes through two openings 312 of the body 310 of the second valve assembly 300 in valve port 220b. Then, the filtered water exits via outlet port 222b into the house water network.

In an alternative embodiment, the manifold assembly 200 does not include detents to set the automatic and manual modes. Instead, a bias spring surrounds the top end stem 350 and is compressed between the central large diameter portion 306 and the top portion 209 of the housing 204. As a result, the spring biases the valve gear 305 downward into the automatic mode. To operate in manual mode, the user must pull up on the knob 302 to overcome the bias spring and disengage the central large diameter portion 306 from the motor assembly 502, then the knob 302 can be rotated. When the knob 302 is released, the spring force presses the valve gear 305 downward again into engagement with the motor assembly 502.

Figure 7:
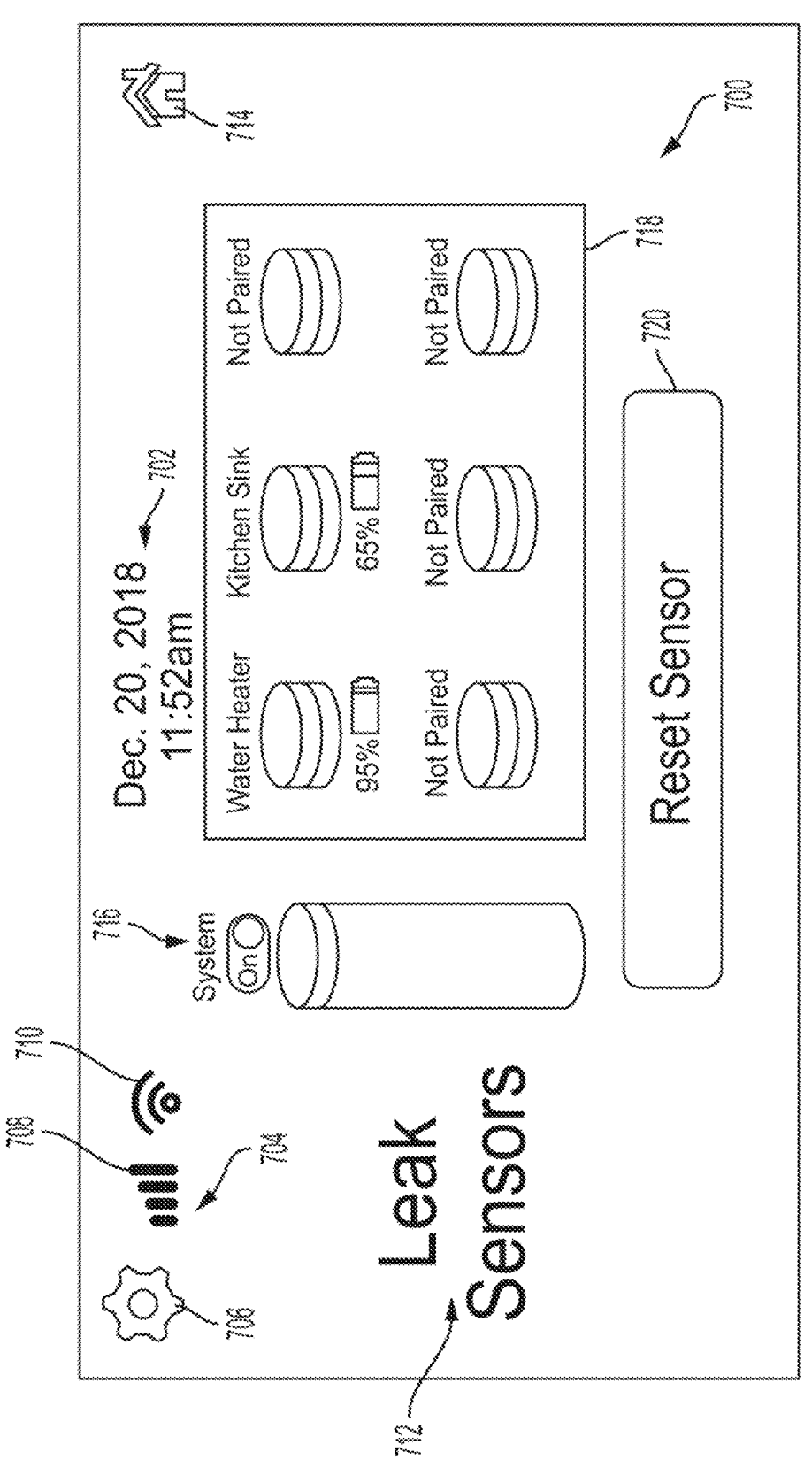
FIG. 7 is one possible controller touch screen display, in accordance with the subject technology.

Referring now to FIG. 7, touch screen display 700 of the controller 111 is shown. It is envisioned that similar displays as available on the controller 11 may be presented on a mobile device in communication with the controller 111 to accomplish identical functionality. As noted above, the controller 111 may be integral with the top cover 110 (FIG.

1) with a touch screen for displaying information and receiving user input. The controller is preferably able to present a plurality of different displays or graphical pages by navigating through a menu driven display and the like. The controller 111 may also process signals from sensors and/or receive input wirelessly from a linked smart phone running a specific application.

In the display 700, the date and time are shown in a top area 702. The upper left hand corner 704 includes a settings icon 704 for accessing a series of settings for configuration of the controller 111. The corner 704 also has a cellular connectivity icon 708 and a wireless WiFi icon 710. A title area 712 provides headline information regarding the display. In this case, the "Leak Sensor" page is shown. The display 700 also includes a home icon 714 for accessing a plurality of various pages and displays as needed to review and direct operation of the controller 111.

Another area 716 shows the status of the leak sensor monitoring, in this case as "on." The leak sensors may be in the base 102 or at the bottom of the pressure vessel 106 (see FIG. 1) as well as other places such as the water heater, sump pump, one or more sinks, toilet areas and the like where undesired water leakage may occur. The leak sensors can be puck shaped devices that connect to the controller 111, whether wired or wirelessly. The leak sensors send a signal for actuating the manifold assembly 200 for automatic closing of the water supply (e.g., the shut-off position) in the event of a leak.

By using the controller 111, the user can pair a plurality of leak sensors and give each sensor a name as shown on the display 700 in area 718. Each sensor is depicted with the respective name, coloration to indicate status (e.g., blue as active and normal operation), and a battery life indication if relevant. The display 700 can change the color (e.g., red to indicate an error condition) or otherwise (e.g., flashing indicates error) indicate the leak sensor that generated the leak signal. Once the error condition is remedied, the controller touch screen can be used to select the "Reset Sensor" button 720.

Another exemplary sensor would be a RFID sensor to read a RFID tag on the replacement filter cartridges. By collecting information regarding the filter cartridge associated with the RFID tag, the controller 111 can verify a proper filter is being used as well as check inventory to prevent fraud. For example, the controller 111 can read a serial or inventory number that is checked against a master list accessed by the cloud.

Still another sensor may be a flow sensor for monitoring the amount of water having passed through the filter. Based on a predetermined threshold, such as 100.000 gallons of use, the controller 111 may provide a text reminder to the cell phone of the homeowner regarding the need to change to the filter. The controller 111 may also display a screen indicating that the remaining filter life as well as provide updates and reminders to the homeowner regarding such maintenance.

The controller 111 may communicate with an irrigation system. Thus, based on a signal from the irrigation system, the controller 111 may switch the manifold 200 into the bypass position during watering of the lawn to conserve filter life. After completion of the irrigation cycle, the controller 111 returns the manifold 200 to the normal position. Alternatively, the controller 111 may include a time clock synchronized to the irrigation system. By being synchronized with the irrigation system, the controller 111 may simply switch to the bypass position during the watering times based upon accessing the stored watering time data.

Further, the controller 111 may incorporate irrigation control so that not only is the manifold 200 controlled by the controller 111, but the irrigation components as well. Such usage may be accessed via menu of the touch screen display or via a software application on a smart device such as a laptop, tablet and cell phone.

Figure 8A:
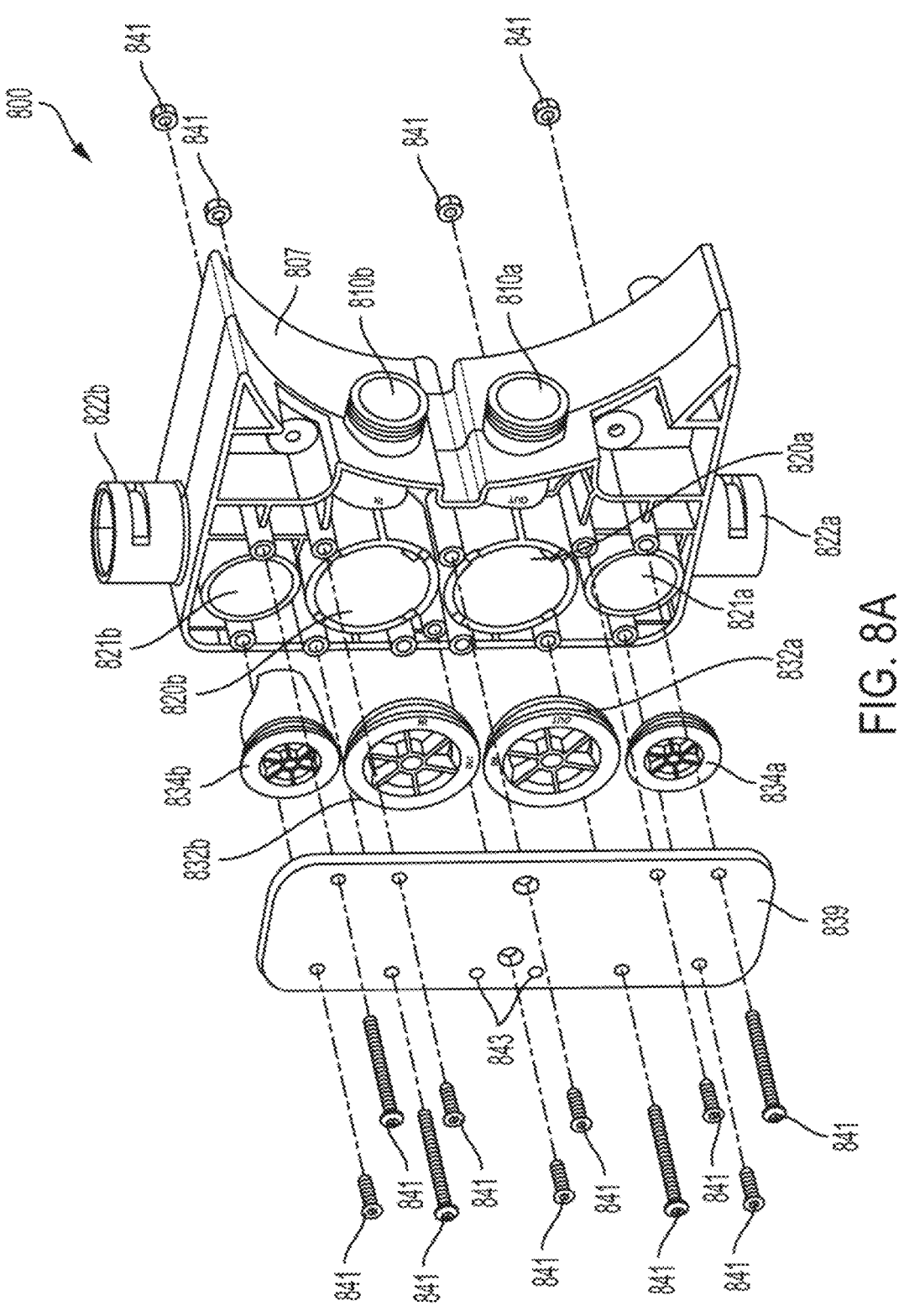
FIGS. 8A and 8B illustrate a bottom perspective view of another manifold assembly, in accordance with the subject technology.
Figure 8B:
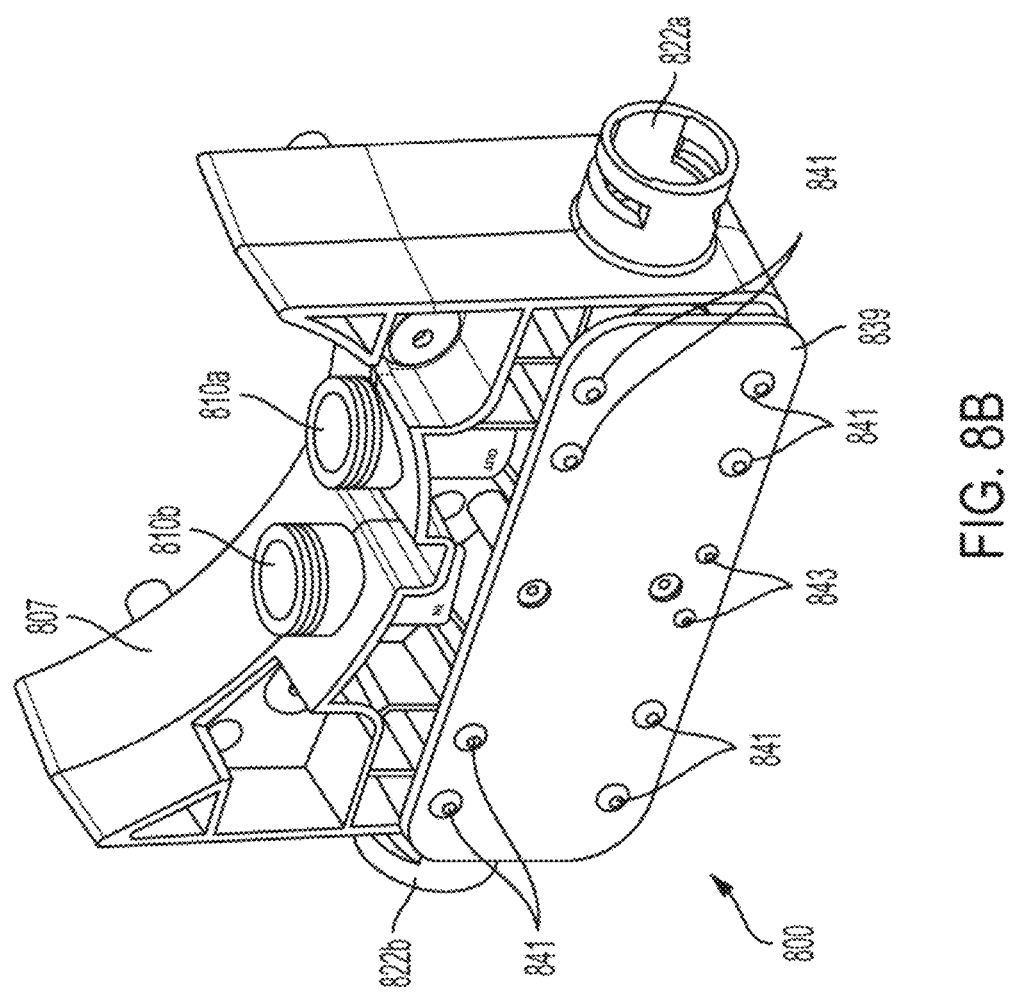

Referring now to FIGS. 8A and 8B, bottom perspective views of another manifold 800 are shown. Similar elements to those described in connection with above-described embodiments are indicated with the like reference numbers. Many elements are essentially the same as those of the foregoing embodiments and, thus, are not further described herein. The following discussion is directed to the primary differences.

The bottom portion 807 of the housing 804 includes sensor retainers 834*a*, 834*b* and valve retainers 832*a*. 832*b*. The valve retainers 832*a*, 832*b* include indicia to help with proper orientation during assembly. A flat cover 839 seals the bottom portion 807 and holds the retainers 832*a*, 832*b*, 834*a*, 834*b* in place. The flat cover 839 is attached using fasteners 841. The flat cover 839 includes mounting holes 843 for attaching the mounting bracket (not shown) that secures the water filter system 100 to a wall or other support structure.

While the disclosure has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting, the full scope rather being conveyed by the appended claims.

What is claimed is:

1. A leak detection and response system for a pressure vessel, the leak detection and response system comprising:
  a valve assembly including:
    a housing configured for fixture to an outer surface of the pressure vessel, the housing defining an internal passageway;
    an internal inlet port and an internal outlet port extending from the housing for attaching to corresponding ports of the pressure vessel, the internal inlet port and the internal outlet port forming a portion of the internal passageway;
    a valve port assembly disposed partially inside the housing in fluid communication with the internal passageway;
    an external inlet port and an external outlet port extending from the housing for connecting to an external water network, the external inlet port and the external outlet port also forming a portion of the internal passageway;
    a first sensor port in fluid communication with the internal passageway and disposed either between the external outlet port and the internal inlet port, or between the external inlet port and the internal outlet port;
  a first leak sensor positioned in the first sensor port for generating a signal indicating a presence of water;
  a controller configured to: receive the signal from the first leak sensor; and control the valve assembly to automatically align the valve port assembly to block water flow from the external inlet port based upon the signal;
  a second sensor port in fluid communication with the internal passageway and disposed, relative to the first sensor port, in an other of between the external outlet port and the internal inlet port, or between the external inlet port and the internal outlet port; and
  a second leak sensor positioned in the second sensor port for generating a second signal indicating a presence of water.

2. The leak detection and response system of claim 1, wherein the controller is configured to display an error condition indicating a location of the first leak sensor when the controller switches to block water flow from the external inlet port.

3. The leak detection and response system of claim 1, wherein the controller is further configured to:
  receive the second signal;
  control the valve assembly to automatically align the valve port assembly to block water flow from the external inlet port based upon the second signal;
  name the first and second leak sensors for providing an indication of location;
  depict the first and second leak sensors on a display with a respective name;
  depict the first and second leak sensors on the display with a coloration to indicate status;
  depict the first and second leak sensors on the display with a respective battery life indication; and
  selectively reset depiction of the first and second leak sensors on the display.

4. The leak detection and response system of claim 1, wherein the controller is configured to receive the signal wirelessly from the first leak sensor and communicate the signals wirelessly to a linked smart phone, tablet, or computer running a specific application for display to a user.

5. The leak detection and response system of claim 1, wherein the first sensor is selected from the group comprising: a flow sensor, a pressure sensor, a temperature sensor, a turbidity sensor, a leak sensor, and combinations thereof.

6. The leak detection and response system of claim 1, wherein the valve port assembly comprises a first valve port assembly and a second valve port assembly, and wherein:
  in an operational position, the first valve port assembly is aligned for fluid flow only from the external inlet port to the internal outlet port and the second valve port assembly is aligned for fluid flow only from the internal inlet port to the external outlet port;
  in a bypass position, the first valve port assembly is aligned for fluid flow only from the external inlet port to the second valve port assembly and the second valve port assembly is aligned for fluid flow only from the first valve port assembly to the external outlet port; and
  in a shut-off position, the first valve port assembly is aligned to block fluid flow from the external inlet port.

7. A leak detection and response system for a water filter system, the leak detection and response system comprising:
  a valve assembly including:
    a housing defining an internal passageway;
    an internal inlet port and an internal outlet port extending from the housing for attaching to corresponding ports of the water filter system, the internal inlet port and the internal outlet port in fluid communication with the internal passageway;
    a first and second valve port assemblies disposed partially inside the housing in fluid communication with the internal passageway;
    an external inlet port and an external outlet port extending from the housing, for connecting to an external water network, the external inlet port and the external outlet port also in fluid communication with the internal passageway;

a leak sensor positioned in a sensor port, the sensor port in fluid communication with the internal passageway and disposed between the internal inlet port, the first valve port assembly, and the external outlet port, the leak sensor configured to generate a signal indicating a presence of water;

a second leak sensor positioned in a second sensor port, the second sensor port in fluid communication with the internal passageway and disposed between the internal outlet port, the first valve port assembly, and the external inlet port, the second leak sensor configured to generate a second signal indicating a presence of water; and a controller configured to: receive the signal from the leak sensor; and control the first and second valve port assemblies to block water flow from the external inlet port based upon the signal.

8. The leak detection and response system of claim 7, wherein the controller is configured to display an error condition indicating a location of the leak sensor when the controller switches to block water flow from the external inlet port.

9. The leak detection and response system of claim 7, wherein the controller is further configured to:

receive the second signal;

control the valve assemblies to automatically align the valve port assembly to block water flow from the external inlet port based upon the second signal;

name the leak sensors for providing an indication of location;

depict the leak sensors on a display with a respective name;

depict the leak sensors on the display with a coloration to indicate status;

depict the leak sensors on the display with a respective battery life indication; and selectively reset depiction of the leak sensors on the display.

10. The leak detection and response system of claim 7, wherein the controller is configured to receive the signal wirelessly from the leak sensor and communicate the signals wirelessly to a linked smart phone, tablet, or computer running a specific application for display to a user.

11. The leak detection and response system of claim 7, wherein the sensor is selected from the group comprising: a flow sensor, a pressure sensor, a temperature sensor, a turbidity sensor, a leak sensor, and combinations thereof.

12. A manifold assembly for a water filter system, the manifold assembly comprising:

a housing having a mating surface extending between opposing sides of the housing, the mating surface for fitting to an outer surface of a pressure vessel of the water filter system, the housing defining an internal passageway;

an internal inlet port and an internal outlet port extending from the mating surface for attaching to corresponding ports of the pressure vessel, the internal inlet port and the internal outlet port forming a portion of the internal passageway;

first and second valve port assemblies disposed partially inside the housing in fluid communication with the internal passageway;

an external inlet port and an external outlet port extending from the opposing sides of the housing, respectively, for connecting to an external water network, the external inlet port and the external outlet port forming a portion of the internal passageway;

a leak sensor positioned in a sensor port, the sensor port in fluid communication with the internal passageway and disposed between the internal inlet port and the external outlet port, the leak sensor configured to generate a signal indicating a presence of water;

a second leak sensor positioned in a second sensor port, the second sensor port in fluid communication with the internal passageway and disposed between the internal outlet port and the external inlet port, the second leak sensor configured to generate a second signal indicating a presence of water; and a controller configured to receive the signal from the leak sensor and control the valve port assemblies between an operational position, a bypass position, and a shut-off position, wherein:

in the operational position, the first valve port assembly is aligned for fluid flow only from the external inlet port to the internal outlet port and the second valve port assembly is aligned for fluid flow only from the internal inlet port to the external outlet port;

in the bypass position, the first valve port assembly is aligned for fluid flow only from the external inlet port to the second valve port assembly and the second valve port assembly is aligned for fluid flow only from the first valve port assembly to the external outlet port; and in the shut-off position, the first valve port assembly is aligned to block fluid flow from the external inlet port.

13. The manifold assembly of claim 12, wherein the controller is configured to display an error condition indicating a location of the leak sensor when the controller switches the valve port assemblies to the shut-off position.

14. The manifold assembly of claim 12, wherein the controller is further configured to:

receive the second signal;

control the valve assemblies to automatically align the valve port assembly to the shut-off position based upon the second signal;

name the leak sensors for providing an indication of location;

depict the leak sensors on a display with a respective name;

depict the leak sensors on the display with a coloration to indicate status;

depict the leak sensors on the display with a respective battery life indication; and selectively reset depiction of the leak sensors on the display.

15. The manifold assembly of claim 12, wherein the controller is configured to receive the signal wirelessly from the leak sensor and communicate the signals wirelessly to a linked smart phone, tablet, or computer running a specific application for display to a user.

16. The manifold assembly of claim 12, wherein the sensor is selected from the group comprising: a flow sensor, a pressure sensor, a temperature sensor, a turbidity sensor, a leak sensor, and combinations thereof.

* * * * *